United States Patent [19]
Tabloski, Jr. et al.

[11] Patent Number: 5,999,729
[45] Date of Patent: Dec. 7, 1999

[54] SYSTEM AND METHOD FOR DEVELOPING COMPUTER PROGRAMS FOR EXECUTION ON PARALLEL PROCESSING SYSTEMS

[75] Inventors: Theodore F. Tabloski, Jr., Concord; Michael J. McCarthy, Boston; Steven J. Sistare, Arlington; John A. Sullivan, Reading, all of Mass.

[73] Assignee: Continuum Software, Inc., Woburn, Mass.

[21] Appl. No.: 08/812,155

[22] Filed: Mar. 6, 1997

[51] Int. Cl.[6] .................................................. G06F 9/445
[52] U.S. Cl. ........................................................ 395/701
[58] Field of Search ............................ 395/706, 683, 395/677, 701, 800.14; 711/171; 345/419, 640

[56] References Cited

U.S. PATENT DOCUMENTS

| | | | |
|---|---|---|---|
| 5,088,034 | 2/1992 | Ihara et al. ............................. | 395/706 |
| 5,095,522 | 3/1992 | Fujita et al. ............................. | 395/683 |
| 5,410,696 | 4/1995 | Seki et al. ............................... | 395/706 |
| 5,418,952 | 5/1995 | Morley et al. ....................... | 395/800.14 |
| 5,421,012 | 5/1995 | Khoyi et al. ............................ | 395/677 |
| 5,452,468 | 9/1995 | Peterson ................................. | 345/419 |
| 5,479,598 | 12/1995 | Feitelson et al. ..................... | 345/340 |
| 5,539,899 | 7/1996 | Huynh et al. .......................... | 711/171 |

OTHER PUBLICATIONS

Dialog(R) File, Title: Data–Flow Approach to Multitasking on Cray X–MP Computers, by Reinhardt, Steve, published at ACM, 1985.

*Primary Examiner*—Traiq R. Hafiz
*Assistant Examiner*—Chameli C. Das
*Attorney, Agent, or Firm*—Richard A. Jordan

[57] ABSTRACT

A parallel program development and processing system includes a parallel program development section and a parallel program execution section. The parallel program development section allows a program developer to develop programs for execution by a parallel computer system using a predetermined set of components which can be selected by the program developer, using a graphical user interface, and linked in a dataflow graph that represents the order of operations to be performed by the program on the data to be processed. After the program developer has developed the graph, the parallel program development section generates executable program code from the instances of the components and their interconnections, for execution by a parallel computer. In the executable program code, instances of the components selected by the program developer form executable objects which are executed by the parallel computer under control of a run-time system that includes an execution control object. The execution control object controls processing of the executable objects using a dataflow processing model, in which each executable object processes data which it receives, but blocks if it has no data to process or if a downstream element is unable to receive data that it has processed. When an executable object blocks, the execution control object is called to correct the blocking condition. When the blocking condition is corrected, the execution control object enables the blocked executable object to resume operations.

21 Claims, 12 Drawing Sheets

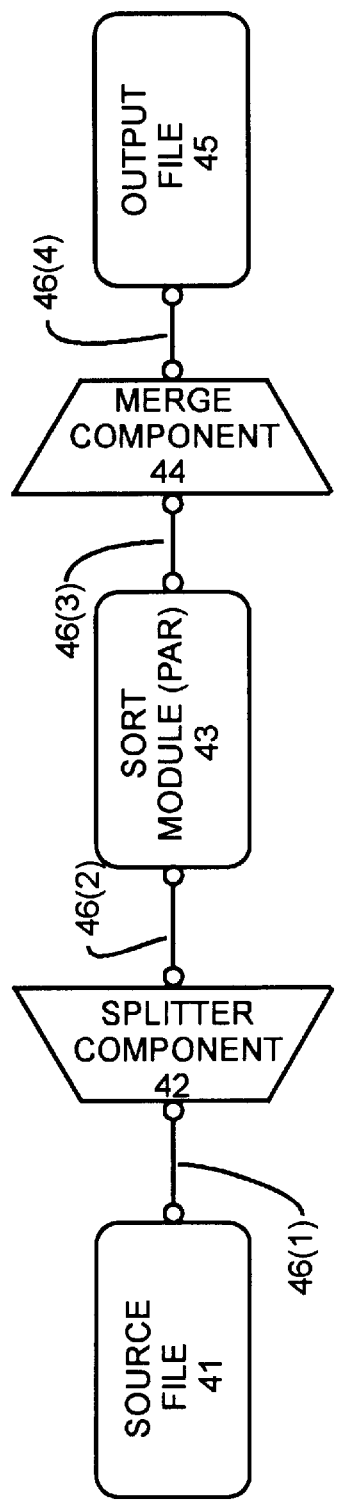
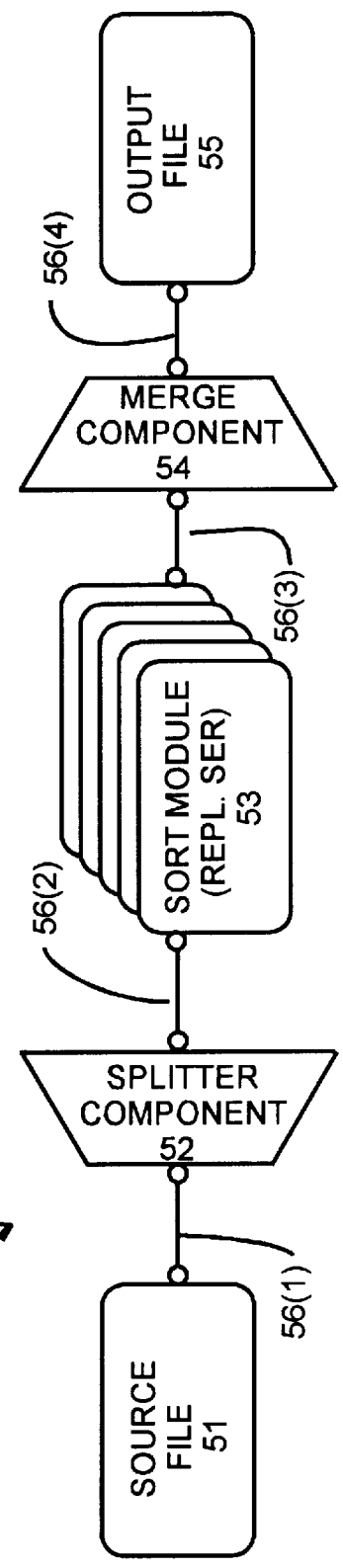

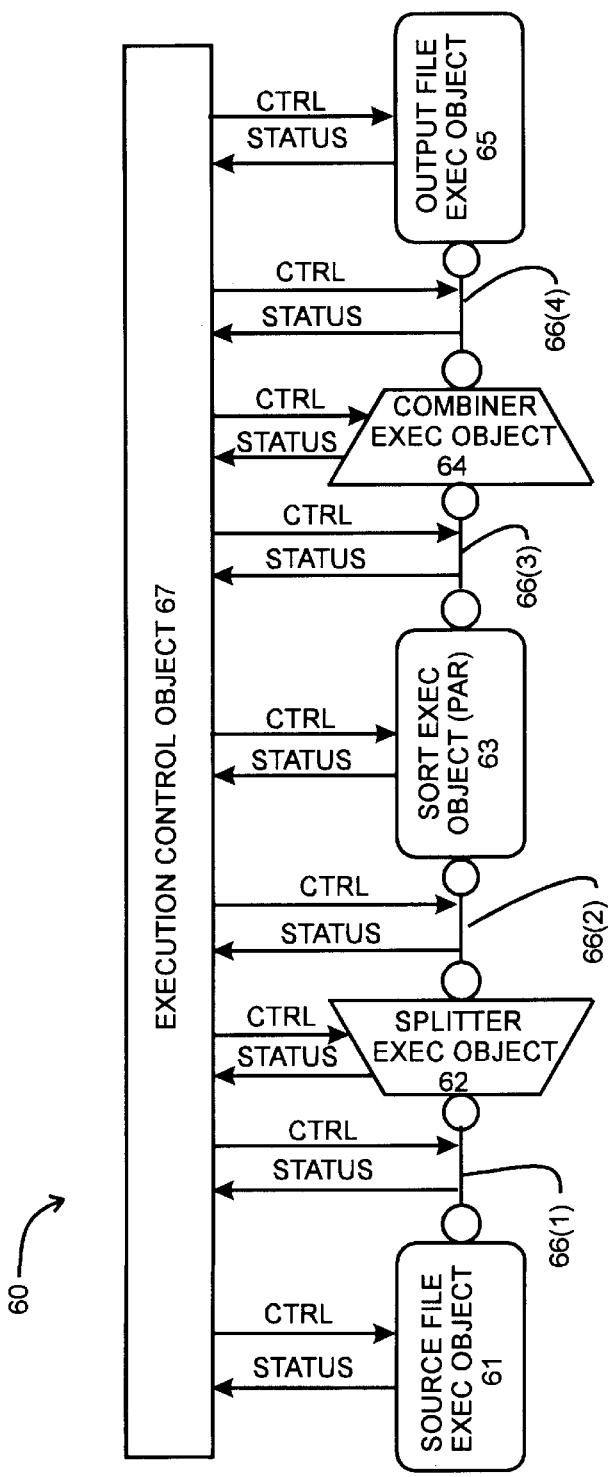
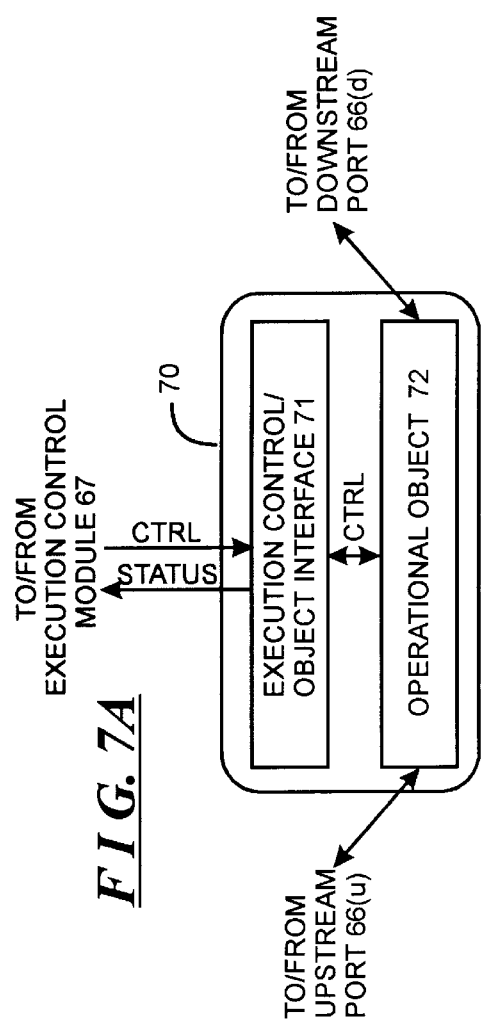
*FIG. 7*
*FIG. 7A*

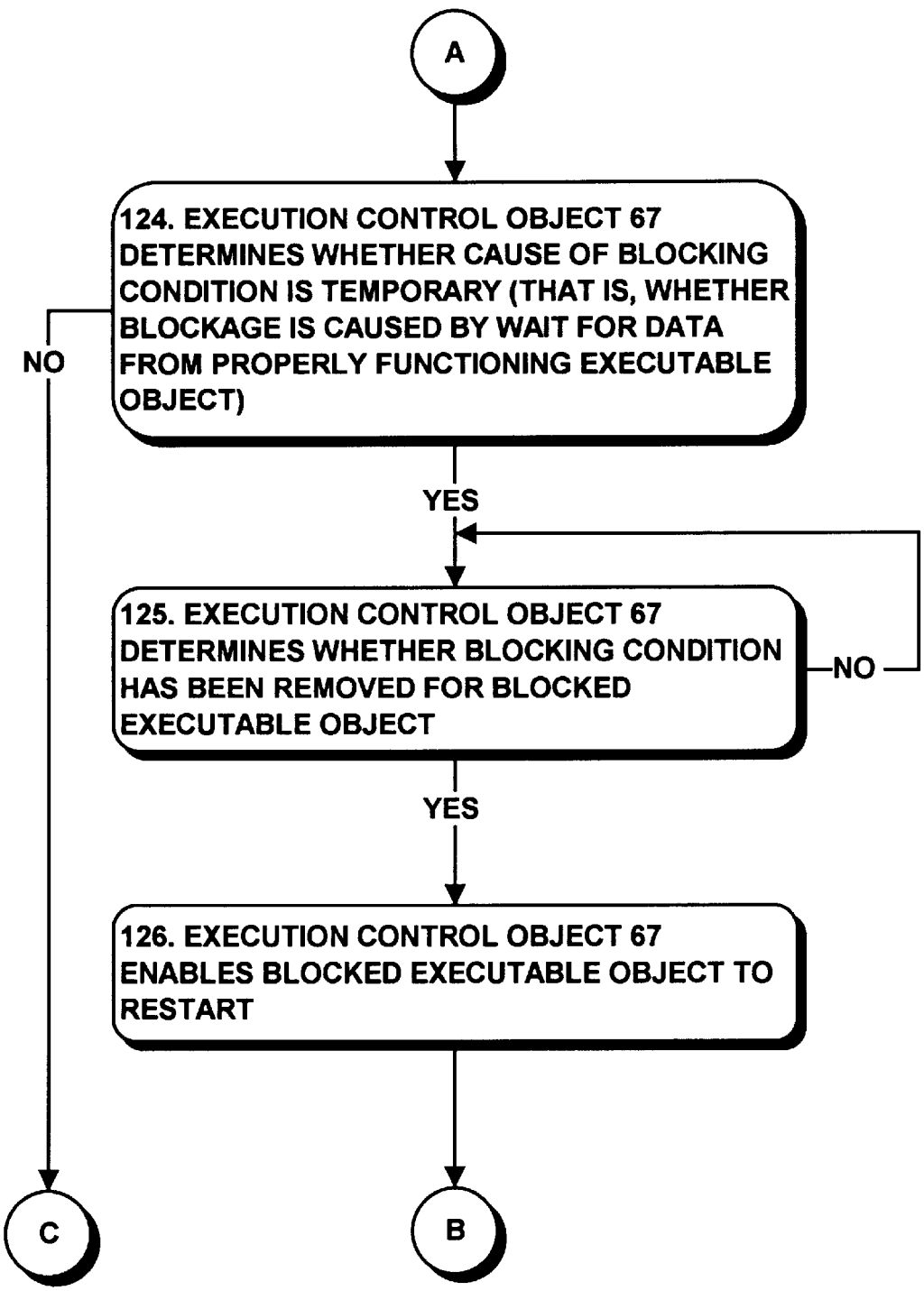
FIG. 9 (CONT. A)

FIG. 9 (CONT. B)
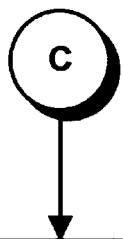
127. EXECUTION CONTROL OBJECT 67 IDENTIFIES MALFUNCTIONING UPSTREAM EXECUTABLE OBJECT AND PERFORMS PREDETERMINED CORRECTIVE OPERATIONS IN CONNECTION THEREWITH
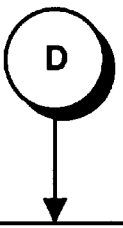
128. EXECUTION CONTROL OBJECT 67 BUFFERS DATA FROM PORT EXECUTABLE OBJECT DOWNSTREAM FROM BLOCKED EXECUTABLE OBJECT
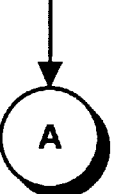

5,999,729

SYSTEM AND METHOD FOR DEVELOPING COMPUTER PROGRAMS FOR EXECUTION ON PARALLEL PROCESSING SYSTEMS

FIELD OF THE INVENTION

The invention relates generally to the field of systems and methods for developing and debugging computer programs, and more particularly to systems and method for developing computer programs for execution on parallel processing systems, that is, computer systems which include a plurality of processors for processing data in a parallel or otherwise coordinated manner.

BACKGROUND OF THE INVENTION

Parallel processing systems offer the promise of providing increased processing power at relatively low cost. In parallel processing systems, a plurality of individual digital data processors are used to process portions of a program and/or data in parallel, so that the program can be processed in a shorter period than if the portions comprising the program were processed in series. A problem arises, however, in connection with developing programs for parallel processing systems. Generally, such programs are relatively difficult to develop, debug and maintain, and often require highly-trained program developers. Accordingly, although parallel processing systems are available, since the number of program developers trained in parallel program development is quite limited, such systems are not widely used, particularly in business and industrial settings.

SUMMARY OF THE INVENTION

The invention provides a new and improved system and method which assists in simplifying development and processing of programs for parallel processing systems.

In brief summary, the new system includes a parallel program development section and a parallel program execution section. The parallel program development section provides for development of programs for execution by a parallel computer system using a predetermined set of components which can be selected by a program developer, using a graphical user interface, and linked in a dataflow graph that represents the order of operations to be performed by the program on the data to be processed. In one embodiment of the invention, there are several general groups of component types, including (i) A file handling component group, whose components are used to identify and provide information concerning sources for data to be processed by the program under development, and destinations for the data processed by the program;

(ii) A data distribution component group, whose components are used to control the distribution of data to be processed from the respective data source(s) to the various processors of the parallel computer for processing, the distribution of data among the respective processors between processing operations, and the transfer of data from the respective processors to the destination(s);

(iii) A data processing component group, whose components are used to control the actual processing of the data distributed to the processors by the respective processors; and (iv) A component interconnection group, whose component (namely, a port component) is used to interconnect components and modules comprising the other groups in the dataflow graph, thereby to define the series of operations to be performed in the program.

Included among the data distribution group are components such as a splitter component; a spreader component; a combiner component; and an adapter component; which the program developer can instantiate in the program under development and use to control distribution of data to be processed among the processing elements comprising the parallel computer system for processing, and to further control the transfer of the processed data from the processing elements to files for, for example, storage.

The components of the data processing component group include a serial component, a replicated component and a parallel processing component. The serial component and replicated component can be associated with zero or more serial modules, whereas the parallel processing component can be associated with zero or more parallel processing modules. A parallel processing module is executed by all, or a selected subset, of the processing elements comprising the parallel computer which is to process the program being developed, and can initiate communications among the processing elements comprising the computer. Each instance of a serial module will be executed by one processing element, but, if associated with the replicated component, will be replicated across all or a selected subset of the processing elements by a replicator module which is also included in the parallel program development section. The scalar processing modules will not initiate communications among the processing elements comprising the parallel computer.

After the program developer has developed the graph defining the program under development, the parallel program development section generates executable program code from the instances of the components and modules and their interconnections, for execution by the parallel computer. In the executable program code, instances of the components and modules selected by the program developer form executable objects which are executed by the parallel computer under control of a run-time system that includes an execution control object. After program code for the executable objects is distributed among the processing elements of the parallel computer, the execution control object controls processing of the executable objects using a dataflow processing model, in which each executable object processes data which it receives, but blocks if it has no data to process, or if a downstream element is unable to receive data that it has processed. When an executable object blocks, the execution control object is called to correct the blocking condition. When the blocking condition is corrected, the execution control object can enable the blocked executable object to resume operations.

In a particular aspect of the invention, each instance of a component and module is provided with one or more input and/or output ports which represent respective mechanisms for receiving data from another component or module (in the case of input ports), or respective mechanisms for providing data to another component or module (in the case of output ports). In that embodiment, the parallel program development section generates, in addition to the executable objects associated with the respective instances of the components and modules in the dataflow graph ("component/module objects"), executable objects which are associated with their respective ports ("port objects"). The port objects handle transfers of data to and from their respective component/module objects so that, if a component/module object requires data for processing, it (that is, the component/ module object) will request such data from its input port object, and if a component/module object has data to be transferred to another component/module object, it will provide such data to its output port object. If (i) the input port object does not have data to provide to its requesting component/module object, which may occur if, for example, an output port object associated with a component/module object that is upstream thereof in the dataflow graph does not have data to provide thereto, or (ii) the output port object cannot accept data from its transferring component/module object, which can occur if, for example, an input port object associated with a component/module that is downstream thereof in the dataflow graph cannot accept data therefrom, the respective input or output port object will be in a blocking condition. At that point, the respective input or output port object will call the execution control object to correct the blocking condition. When the blocking condition is corrected, the execution control object can enable the blocked input or output port object to resume operations. Such an arrangement allows the use of conventional program objects as the component and module objects in parallel programs developed using the parallel program development section, that is, the components and module objects do not need to be constructed so as to be aware of the execution control object. The component and module objects need only be constructed to communicate to request data from and/or provide data to respective input and/or output port objects, while the port objects along with the execution control object essentially determine whether progress can be made in processing the program. The port objects effectively interact with the execution control object on behalf of their respective components and modules. The invention thus provides for the use of standard serial or parallel software routines, or serial or parallel software routines which are developed by the program developer and not supplied by the parallel program development section, which can simplifying their adaptation for use in complex parallel programs.

In a further aspect of the invention, the parallel program development section provides a graphical user interface ("GUI") that allows a program developer to generate a program using icons representing the respective instances of the components and modules to be used in the dataflow graph and their interconnections. The GUI includes a window in which the program developer generates the iconic representation of the dataflow graph, and toolboxes representing the types of components and modules which can be instantiated. The program developer, using a mouse, can use a "drag and drop" methodology to select icons in the respective toolboxes and drag them into the window thereby to instantiate them. By using the mouse to click on bubbles associated with each icon, which represent the ports for the respective component or module associated with the icon, the program developer can establish links between the icons which define the interconnections in the graph. The GUI allows a program developer to view the program logic, represented by the dataflow graph displayed in the window, and hides details of complex program coding which is often required in development of programs for execution on parallel computer systems.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 6A and 6B depict illustrative dataflow graphs for illustrative parallel programs developed using the parallel program development section depicted in FIG. 2;

FIGS. 7 and 7A together depict an illustrative program execution environment, for executing the parallel program depicted in FIG. 6B, provided by the parallel program execution section depicted in FIG. 2.

DETAILED DESCRIPTION OF AN ILLUSTRATIVE EMBODIMENT

The invention provides a system for use in graphically developing programs for execution by parallel computer systems. Parallel computer systems which may execute programs developed by the system include, for example, conventional shared- and distributed-memory multiple processor computers, with the distributed-memory multiple processor computers including multiple instruction/multiple data ("MIMD") computers, and single program/multiple data ("SPMD") computers. Typically, a parallel computer system includes a plurality of processors which can communicate to transfer data and/or status information either through a network (typically in the case of a distributed memory multiple processor computer) or through a shared memory (typically in the case of a shared memory multiple processor computer).

Figure 1:
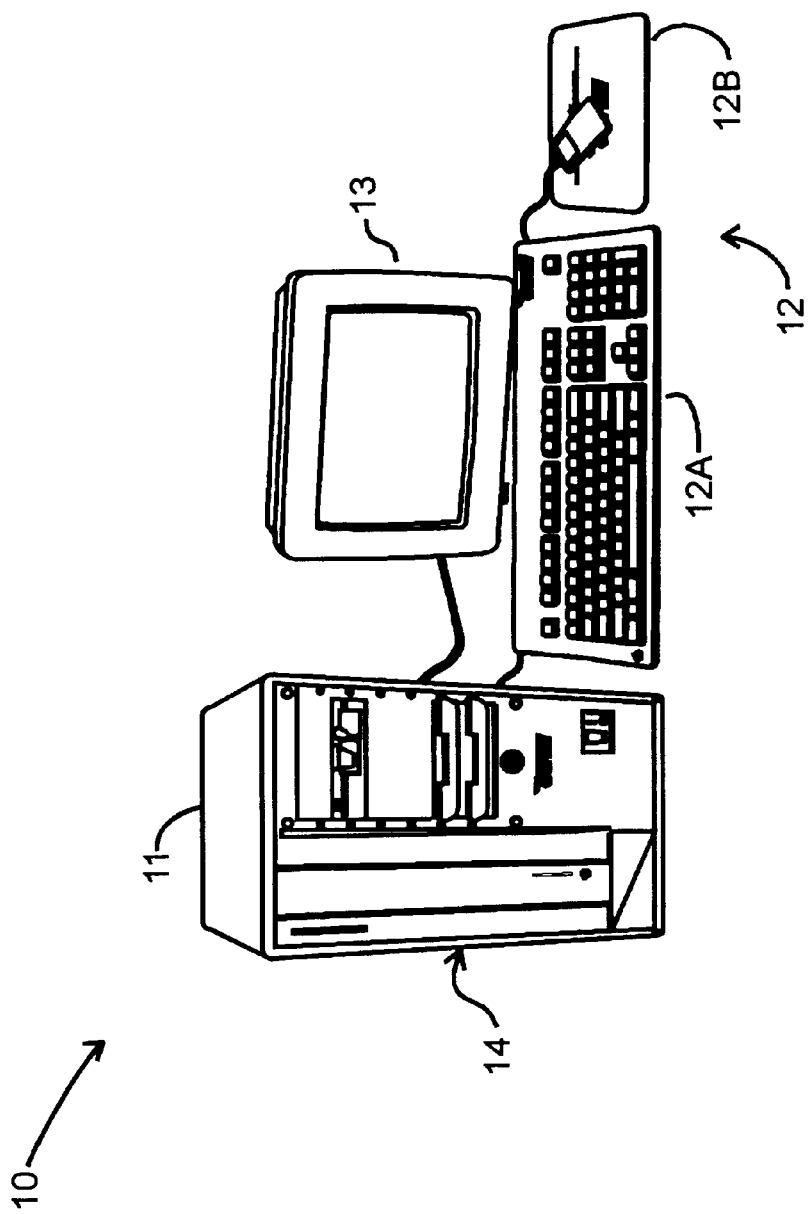
FIG. 1 is a functional block diagram of an illustrative digital computer system for use in connection with the parallel program development system constructed in accordance with the invention.
Figure 2:
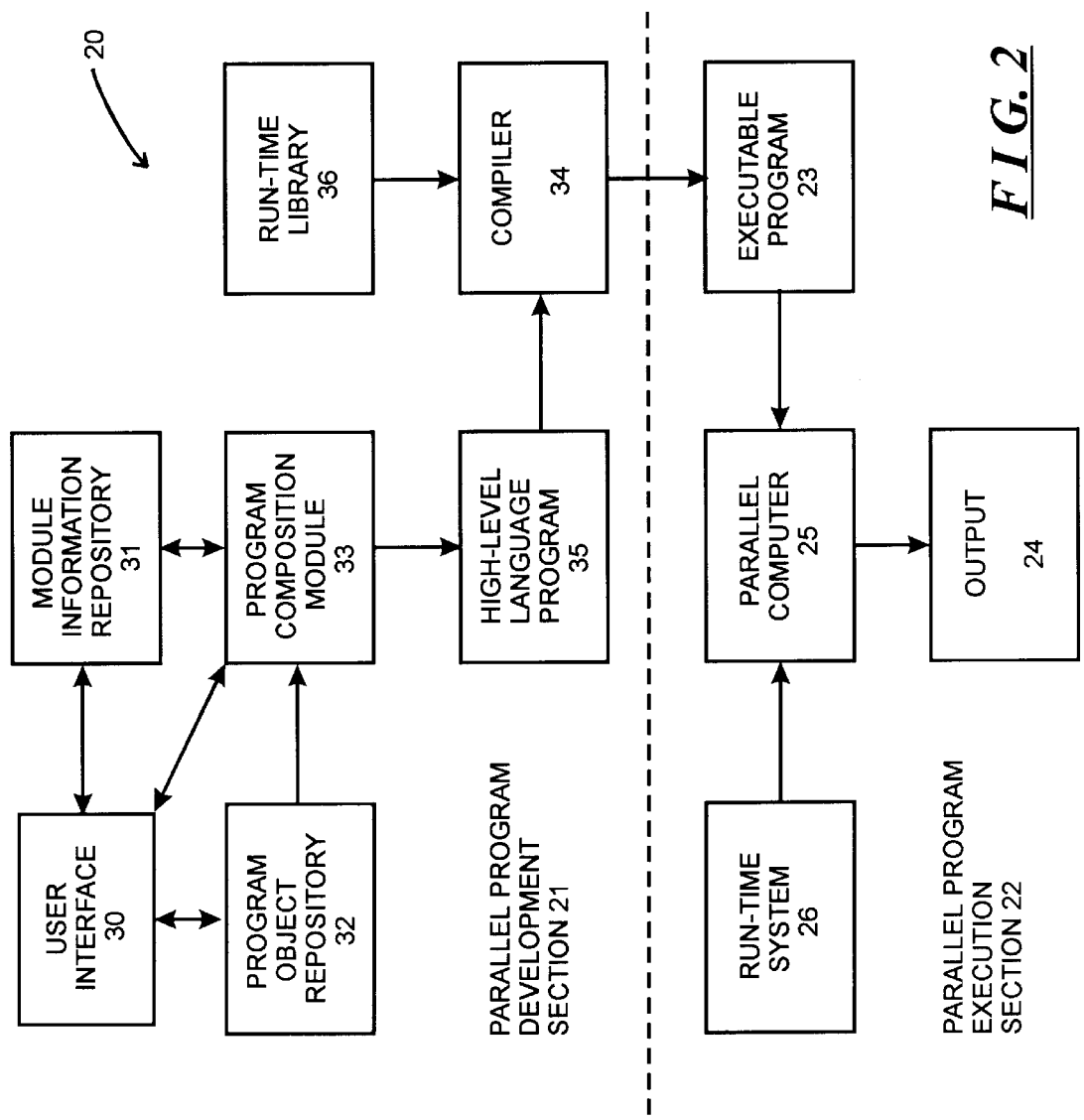
FIG. 2 is a functional block diagram of a parallel program development system including a parallel program development section and a parallel program execution section, constructed in accordance with the invention.

The functional structure of the graphical parallel program development system will be described in connection with FIG. 2. Generally, development of parallel programs using the graphical parallel program development system can be performed on a conventional serial digital computer, such as a personal computer or workstation. FIG. 1 is a functional block diagram of an illustrative computer system 10 for use in connection with the graphical parallel program development system. With initial reference to FIG. 1, the computer system 10 in one embodiment includes a processor module 11 and operator interface elements comprising operator input components such as a keyboard 12A and/or a mouse 12B (generally identified as operator input element(s) 12) and an operator output element such as a video display device 13. The illustrative computer system 10 is of the conventional stored-program computer architecture. The processor module 11 includes, for example, processor, memory and mass storage devices such as disk and/or tape storage elements (not separately shown) which perform processing and storage operations in connection with digital data provided thereto. The operator input element(s) 12 are provided to permit an operator to input information for processing. The video display device 13 is provided to display output information generated by the processor module 11 on a screen 14 to the operator, including data that the operator may input for processing, information that the operator may input to control processing, as well as information generated during processing.

The processor module 11 generates information for display by the video display device 13 using a so-called "graphical user interface" ("GUI"), in which information for various applications programs is displayed using various "windows." A window used in one embodiment of the invention will be described below in connection with FIG. 6. Although the computer system 10 is shown as comprising particular components, such as the keyboard 12A and mouse 12B for receiving input information from an operator, and a video display device 13 for displaying output information to the operator, it will be appreciated that the computer system 10 may include a variety of components in addition to or instead of those depicted in FIG. 1.

In addition, the processor module 11 can include one or more network ports, generally identified by reference numeral 14, which are connected to communication links which connect the computer system 10 in a computer network. The network ports enable the computer system 10 to transmit information to, and receive information from, other computer systems and other devices in the network.

As indicated above, the invention provides a graphical parallel program development system 20 for use in developing programs for execution by a parallel computer system. A functional block diagram of the graphical parallel program development system 20 will be described in connection with FIG. 2. With reference to FIG. 2, the graphical parallel program development system 20 includes two sections, including a parallel program development section 21 and elements of a parallel program execution section 22 as indicated below. The parallel program development section 21, which may be used in connection with the computer system 10 depicted in FIG. 1, is used by the program developer to develop a program for execution on a parallel computer system. The parallel program development section 21 generates an executable program 23, which is processed by the parallel program execution section 22 to generate an output 24. The parallel program execution system is shown in FIG. 2 as including the aforementioned parallel computer system 25. The parallel computer system 25 processes the executable program 23 generated by the parallel program development section in connection with a run-time system that includes an execution control for controlling processing of the executable program 23 as will be described below.

The parallel program development section 21 is used by a program developer to develop a program, represented by executable program 23, for execution by the parallel computer system 25. The parallel program development section includes a user interface 30, a module information repository 31, a program object repository 32, a program composition module 33, and a compiler 34. Using the user interface 30, a program developer develops a parallel program using program elements, including program components and program modules, which will be described in detail below. Information about the program modules which may be used in a parallel program are stored in the module information repository 31. Information about instances of the program elements which are selected and instantiated as program objects by the program developer are stored in the program object repository 32. The user interface 30 allows the program developer to develop the parallel program graphically, using icons to represent instantiated program objects and links interconnecting respective objects to represent the flow of data through the parallel program being developed.

After the program developer has graphically developed the parallel program, he or she may, through the user interface 30, enable the program composition module 33 to retrieve the object instance information from the program object repository and generate a program in a high-level language, using the information for the respective objects as stored in the module information repository 31. If, during high-level language program generation, the program composition module 33 determines that there are errors in the parallel program as developed by the program developer, it can provide an indication thereof to the user interface 30 for display to the program developer. In one particular embodiment, the program composition module 33 generates the program in the well-known C++ high-level language, which is an object-oriented language, although it will be appreciated that other object-oriented and non-object oriented high-level languages may be used. The high-level language program generated by the program composition module, which is represented by high-level language program 35, is compiled by the compiler 34, during which a run-time library 36 is linked in a conventional manner, to generate the executable program 23.

As indicated above, the program developer generates a parallel program using program elements, including components and modules, which are available through the user interface 30. Operations performed by the operator in connection with developing a parallel program using the user interface 30 will be described below in connection with FIGS. 3 through 5. Generally, the parallel program defines, and is shown to the program developer by the user interface 30 as, a dataflow graph comprising interconnected instances of various types of components and modules. In one embodiment of the invention, there are several general groups of component types, including (i) A file handling component group, whose components are used to identify and provide information concerning sources for data to be processed by the program under development, and destinations for the data processed by the program. The program developer can use components in the file handling component group to identify and provide information as to characteristics of the source(s) of data to be processed by the program, and destination(s) of the processed data. In one embodiment, the source(s) and destination(s) may comprise, for example, any conventional file designation used by the Unix operating system;

(ii) A data distribution component group, whose components are used to control the distribution of data to be processed from the respective data source(s) to the various processors of the parallel computer 25 for processing, the distribution of data among the respective processors between processing operations, and the transfer of data from the respective processors to the destination(s);

(iii) A data processing component group, whose components are used to control the actual processing of the data distributed to the processors by the respective processors; and (iv) A component interconnection group, whose component (namely, a port component) is used to interconnect components and modules comprising the other groups in the dataflow graph, thereby to define the series of operations to be performed in the program.

Each group comprises at least one component.

In one embodiment, the file handling component group includes two types of component, namely, a file component and a record component. The file component is used to identify any source or destination of data using, as noted above, any conventional Unix file designation. Whether a file is a source, a destination, or both, will be determined by and evident from how it is connected in the dataflow graph defining the program. The record component is used to define****(?).

In that same embodiment, there are three types of components of the data processing component group, namely a serial component, a replicator, and a parallel component. Each of these components may, in turn, have one or more modules associated therewith, with each of the modules representing a predetermined type of processing operation which can be performed. Generally, there are two general types of modules which are used in the parallel program development system 20, namely, serial processing modules and parallel processing modules. A serial processing module represents operations to be formed by a single processor. Generally, when an instance of a serial processing module is executed by the parallel computer 25, it (that is, the serial processing module) will not enable communications among processors comprising the parallel computer 25. On the other hand, a parallel processing module represents operations to be performed by all of the processors of the parallel computer 25 generally concurrently, and can enable communication of data, processing status information and/or other types of information among the processors.

A serial component has associated therewith zero or more serial processing modules, which the program developer can select and instantiate to execute on a single processor of the parallel computer 25. For such a module, selected through the serial component, during execution of the program, only one processor will process the serial module. Like the serial component, a replicator component also has associated therewith zero or more serial processing modules. However, unlike a serial component, for a serial processing module selected through the replicator component, the serial processing module will be processed by all, or a predetermined subset, of the processors of the parallel computer concurrently. It will be appreciated that the serial and replicator components allow a program developer to make use of program code, represented by the serial processing modules, written for execution on a serial computer, in a parallel program. As noted above, the serial processing modules, including those selected through both the serial component and the replicator component, will not enable communication between or among processors of the parallel computer 25.

A parallel component, on the other hand, has zero or more parallel processing modules associated therewith. For a parallel processing module selected through the parallel component, the parallel processing module will be processed will be processed by all or a selected subset of the processors of the parallel computer concurrently, and can enable communication of data, processing status information and/or other types of information among the processors.

More specifically, in a parallel program developed using the parallel program development section 21, the actual processing operations on the data are performed by instances of the various types of serial and parallel processing modules (which will collectively be referred to as "processing modules") as selected by the program developer using the serial, replicator and parallel processing components. A number of types of serial and parallel processing modules can be used with programs developed using the parallel program development section 21, each for performing one or more particular types of processing operation. A variety of types of processing operations may be performed by the processing modules, including, for example, low-level or "black box" operations such as sort operations of various types, search operations to locate data having particular search characteristics, and the like, as well as higher-level or more complex operations such as a FFT (fast-Fourier transform) operation.

A serial processing module, when instantiated and processed by the parallel computer system 25, represents operations to be performed by a single processor of the parallel computer 25. When a serial processing module is selected through the replicator component, a number of copies of the serial processing module will be created, each of which can, for example, be processed by a separate one of the processors of the parallel computer system 25, but in any case processing in response to each copy of the serial processing module instance is carried out separate and apart from each of the other copies; effectively, there is no communication among processors, or among processes representing the various copies of the serial processing module instance. Each copy of a serial processing module instance is represented as including one or more inputs each of which is associated with the respective input variables (including data structures) which represent the data to be processed and one or more outputs through which it provides respective output variables (including data structures) which represent the processed data. Alternatively, a copy of a serial processing module instance may be represented as including zero inputs if, for example, the serial processing module instance generates and provides data for use by other elements of the program under development; illustrative examples of such serial processing module instances include a random number generator, a module that opens a database and writes records to a stream, and other examples will be apparent to those skilled in the art. Similarly, a copy of a serial processing module instance may be represented as having zero outputs; an illustrative example of such a serial processing module instance includes a module for receiving data from a stream and writing it to a database. The collection of copies of the serial processing module instance will have a like number of such inputs, if any, with one input being associated with each input variable, and a like number of outputs, if any, with one output associated with each output variable.

A parallel processing module differs from a serial processing module in that a single instance of a parallel processing module can be processed in parallel on a plurality of processors of the parallel computer system, and can enable communication of data, processing status information and/or other types of information among the processors. A variety of conventional mechanisms may be used to accomplish communications of such information among processors, depending on the particular architecture of the parallel computer system 25 on which the executable program 23 generated by the parallel program development section 21 is processed. Each instance of a parallel processing module is also represented as including one or more inputs each associated with an associated input variable representing data to be processed, and one or more outputs each associated with an output variable representing processed data. Alternatively, as with serial processing module instances, a parallel processing module instance may be represented as including zero inputs or outputs if, for example, the parallel processing module instance retrieves data from a file for use by other elements of the program under development (in the case of a parallel processing module instance that is represented as including zero inputs) or which receives data from other elements of the program under development for storage in a file (in the case of a parallel processing module instance that is represented as having zero outputs). It will be appreciated that the input associated with each input variable represents a distribution of data to be processed to the processors of the parallel computer system 25 which are to be used in processing the parallel processing module instance and further that the output associated with each output variable represents the processed data which can be retrieved from the processors of the parallel computer system 25.

The data distribution component group comprises a plurality of types of components, including, in one embodiment, a spreader component, a splitter component, a combiner component, and an adapter component, which are used to (i) distribute data from the data source(s) to the processors of the parallel computer 25 for processing in connection with the serial or parallel modules selected through the respective serial, replicator and parallel components, (ii) distribute processed data, as processed by the processors in connection with serial or parallel modules, among the processors, for further processing by the processors, and (iii) retrieve the processed data from the processors of the parallel computer for transfer to their respective destination(s).

The splitter component is used to direct the distribution of data from, for example, a single source of data, such as an input file, to a plurality of splitter component "outputs" for processing under control of a selected parallel processing module or a plurality of replicated serial processing modules, as will be described below. The actual number of outputs of a particular instance of the splitter component used in a program will conform to the number of inputs of the parallel processing module or the number of replicated serial processing modules to receive data from the splitter component instance. This number (that is, the number of inputs of the parallel processing module or the number of replicated serial processing modules which are to receive data from the splitter component instance) may be determined by the program developer at program development time. Alternatively, the program developer may leave the number to be determined by the parallel computer system at run-time when the program is being executed. The number of inputs of the parallel processing module or the number of replicated serial processing modules which are to receive data from the splitter component instance may be related to the number of processors of the parallel computer system to be used in executing the program, which the parallel computer system may select at run time.

In any case, when a program developer instantiates an instance of the splitter component for use at a particular point in a program under development, he or she can specify particular characteristics of the data and information that is to be used in distributing the data to its respective outputs. For example, the program developer can provide data type information identifying the particular data type or types for the data input to the splitter component instance and the data type or types which is to be provided at its outputs. In addition, the program developer can provide higher-level "organizational" information concerning the data, indicating, for example, if the data is in the form of a database, and if so the structure of the database and how the data in the database is to be distributed to its various outputs. For example, if the data comprises a relational database comprising a plurality of records and attributes, the program developer can condition the splitter component instance to direct the records to be distributed among its outputs randomly or in a particular ordering which is based on values of one or more attributes of the respective records, as will be described below in more detail. The splitter component allows the program developer to select and enable a particular data distribution arrangement based on a priori knowledge of the subsequent operations to be performed on the distributed data by the parallel processing module instance or the serial processing module instances.

The spreader component is used to perform operations generally similar to those described above in connection with an instance of a splitter component, except that the instance of the spreader component broadcasts the same data to all of the inputs of the parallel processing module or the replicated serial processing modules which are to receive data from the spreader component instance. As noted above, the number of inputs of the parallel processing module or the number of replicated serial processing modules which are to receive data from the splitter component instance may be related to the number of processors of the parallel computer system to be used in executing the program, which the parallel computer system may select at run time, in which case the spreader component can broadcast copies of the same data to all of the processors in the parallel computer system.

The combiner component is used to direct combining or aggregation of data from a plurality of points of information supply to a unitary "output," and thus enables operations to be performed which are effectively the converse of the operations enabled by a splitter component. The actual number of inputs of a particular instance of the combiner component in a program will conform to the number of outputs of, for example, respective ones of the outputs of a parallel processing module instance or number of instances of a particular serial processing module which is to provide data to the combiner component instance, and the output may refer to a file or the input of a single serial processing module instance. Similar to the splitter component, this number (that is, the number of outputs of the parallel processing module or the number of replicated serial processing modules which are to provide data to the combiner component instance) may be determined by the program developer at program development time. Alternatively, the program developer may leave the number to be determined by the parallel computer system at run-time when the program is being executed. The number of outputs of the parallel processing module or the number of replicated serial processing modules which are to provide data to the combiner component instance may be related to the number of processors of the parallel computer system to be used in executing the program, which the parallel computer system may select at run time.

When a program developer instantiates an instance of the combiner component for use at a particular point in a program under development, he or she can specify particular characteristics of the data and information that is to be used in merging the data. For example, the program developer can provide data type information identifying the particular data type or types for the data input to the combiner component instance and the data type which is to be provided at its output. In addition, the program developer can provide higher-level "organizational" information useful in merging the data, indicating, for example, if the data is to be formed into a unitary database, and if so the structure of the database and how the data in the from the parallel processing module instance or serial processing module instances at its (that is, the combiner component instance's) input is to be merged. For example, if the data comprises records to be merged to form a relational database, each record comprising a plurality of attributes with each attribute having a value, the program developer can condition the combiner component instance to direct the records received at its input to be organized into the database in a random manner, or in a particular ordering which is based on values of one or more attributes of the respective records, as will be described below in more detail. The combiner component allows the program developer to select and enable data to be merged in a particular order based on a priori knowledge of the preceding operations performed on the data by the parallel processing module instance or the serial processing module instances.

Both the splitter component and the combiner component are essentially particular "special" cases of the adapter component. An instance of the adapter component is used to direct the distribution of data from, for example, an input representing "n" points of information supply, to an output representing "m" points of information destination, where values of both "n" and "m" can each be one or more, and indeed may be equal. An adapter component instance may be used to, for example, transfer data from one or more component instances (such as a parallel processing module instance, replicated serial processing module instances, or any combination thereof) which have "n" inputs, to one or more component instances which have "m" inputs. The actual values for "n" and "m" may be determined by the program developer at program development time, or the program developer may leave the number to be determined by the parallel computer system at run-time when the program is being executed as described above in connection with the splitter and combiner components.

In a manner similar to that described above in connection with the splitter and combiner components, when a program developer instantiates an instance of the adapter component for use at a particular point in a program under development, he or she can specify particular characteristics of the data to be used in distributing the data among the processors. For example, the program developer can provide data type information identifying the particular data type or types for the data input to the adapter component instance at its input(s) and the data type which is to be provided at its output(s). In addition, the program developer can provide higher-level "organizational" information concerning the data, indicating, for example, if the data is in the form of a database, and if so the structure of the database and how the data in the database is to be distributed to its various outputs. For example, if the data comprises a relational database comprising a plurality of records and attributes, the program developer can condition the adapter component instance to direct the records to be distributed among its outputs randomly or in a particular ordering which is based on values of one or more attributes of the respective records, as will be described below in more detail. The adapter component allows the program developer to select and enable a particular data distribution arrangement based on a priori knowledge of the subsequent operations to be performed on the distributed data by the parallel processing module instance or the serial processing module instances.

Finally, the port component is used to link the other components and modules together to define the series of processing operations to be performed in connection with the program under development. When the port component is instantiated as a connection from one component and/or module to another component and/or module, it (that is, the port component) defines the manner in which data from the first component and/or module is to be distributed for processing by the other component and/or module.

Figure 3:
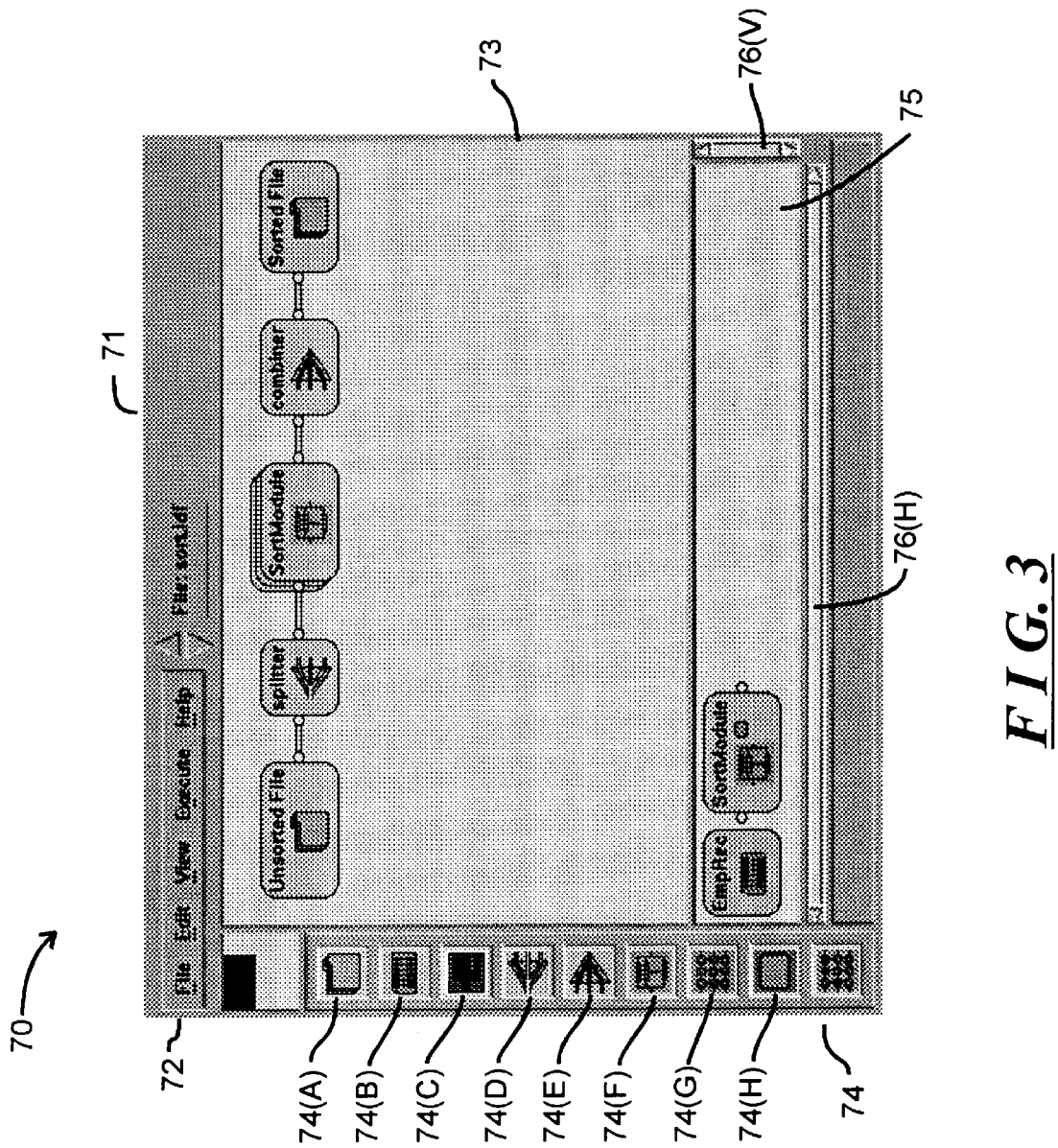
FIGS. 3 through 5 depicts the organization of a window and dialog boxes that are used in the graphical user interface provided by the parallel program development section of one embodiment of the invention.

As described above, the program developer will use the user interface 30 to develop a parallel program. In one embodiment, the user interface 30 provides a graphical user interface (GUI) which represents the instantiated components and modules that the program developer uses in the program in the form of icons depicted on the computer's video display. The user interface 30 provides a program development window and dialog boxes, illustrative ones of which will be described in connection with FIGS. 3 through 5, which the program developer will use to develop the parallel program. With reference to FIG. 3, in one embodiment the program development window 70 comprises an upper title bar 71, including a drop-down menu 72, a program development area 73, a vertical toolbar 74 to the left of the program development area 73, and a lower horizontal toolbar 75 underneath the program development area 73. The title bar 71 displays the title of the program under development as assigned by the program developer, and the drop down menu 72 includes operational commands by which the program developer controls the graphical parallel program development system 20, including, for example, establishing, saving and retrieving computer files defining the program under development, enabling the program composition module 33 to generate a high-level language program 35, and the like.

The vertical toolbar 74 includes icons 74(A) through 74(H), arrayed in a column, that represent components which the program developer can instantiate for use in a program, including a file component icon 74(A), a record component icon 74(B), a spreader component icon 74(C), a splitter component icon 74(D), a combiner component icon 74(E), a replicator component icon 74(F), a parallel processing component icon 74(G) and a serial component icon 74(H). A port component icon is instantiated as described below.

The horizontal toolbar 75 is provided as a shortcut for a program developer to select components and modules for use in a program. In the illustrative window 70 depicted in FIG. 3, only two icons are shown in the horizontal toolbar 75, each of which represents one module that can be instantiated for use in the program under development. It will be appreciated, however, that a number of such modules may be included, each of which will be represented by an icon in the horizontal toolbar 75. Since the icons may extend beyond the visible portion of the horizontal toolbar 75, the horizontal toolbar 75 is provided with horizontal and vertical scroll bars 76(H), 76(V), which permit the program developer to scroll through the toolbar 75. If the size of the window 70 is such that not all of the icons representing components can be displayed in the vertical toolbar 74, the vertical toolbar 74 may also be provided with a scroll bar (not shown).

Using the window 70 and mouse 12B, the program developer develops the program using a "drag and drop" technique. In that operation, the program developer can instantiate a component or module by clicking on its icon in the vertical or horizontal toolbar 74 or 75 with the mouse pointer and, using a dragging motion, dragging the mouse pointer to the program development area 73, after which the user interface 30 will display a copy of the icon in the program development area 73. For modules which are selectable through the respective components, such as serial and parallel processing modules which are selectable through the serial, replicator and parallel processing components, the program developer can select such modules by selecting and opening icons for such components which are copied into the program development area by, for example, double-clicking on the respective icons. When the user interface 30 "opens" the icon, it (that is, the user interface 30) displays a list of serial or parallel processing modules which can be selected using the component associated with the icon. The program developer can select the particular one of the modules to be used for the component. The particular icons displayed in the program development area 73 represent instances of the respective components and modules which are to be used in the program under development.

As the program developer adds copies of icons in the program development area 73 to instantiate the components and modules as described above, he or she can add port icons to indicate data flow from one instance of a component or module, as represented by an icon displayed in the program development area 73, to another instance of a component or module, as represented by another icon displayed in the program development area 73, thereby to indicate the order of processing of the data in the program under development. In the embodiment depicted in FIG. 3, the program developer adds a port between bubbles of two icons by clicking on one bubble, provided on the left and/or right side of one the respective icons, and dragging the mouse to the respective bubble of the second icon. In response, the user interface 30 provides a port icon, which is depicted in FIG. 3 as a two parallel lines interconnecting proximate bubbles. The bubble, if any, on the left side of an icon represents an input to the component or module instance whose icon is adjacent to the bubble. Contrariwise, the bubble, if any, on the right side of an icon represents an output from the component or module instance whose icon is adjacent the bubble. The program development area 73 depicts icons representing components and modules interconnected to form a sorting program, which will be described below in connection with FIGS. 6A through 7.

All of the types of components and modules whose icons are depicted in FIG. 3 have at most one input and/or output, and so all of the icons depicted in FIG. 3 have at most one bubble on each side. It will be appreciated, however, that if a particular type of component or module has inputs for data representing multiple variables, or if it generates as outputs data representing multiple variables, a bubble will be provided for each of the variables adjacent the appropriate side of the icon representing the instance of the respective component or module. In addition, the positioning of the bubbles representing inputs and/or outputs proximate the respective icons as depicted in FIG. 3 disambiguates the inputs and outputs for the respective icons and provides an indication of data flow from left to right; it will be appreciated however, that the positioning of the input and output bubbles can be reversed and, indeed, can be on any side of the respective icons.

While the program developer is developing a program using the program development window 70 depicted in FIG. 3, he or she can customize the instances of the respective components and modules by providing information through dialog boxes that are associated with the respective icons, which will be used later to control generation of the high-level language program by the program composition module 33. The specific customization information that is provided will depend on the particular type of component or module that is represented by the respective icon. For example, for an icon representing a file containing input data to be processed, such as the icon in FIG. 3 having the legend "Unsorted File," the program developer can provide information such as a file name, whether records in the file are sorted and, if so, what according to which attributes, whether the file is to be opened serially or in parallel.

Figure 4:
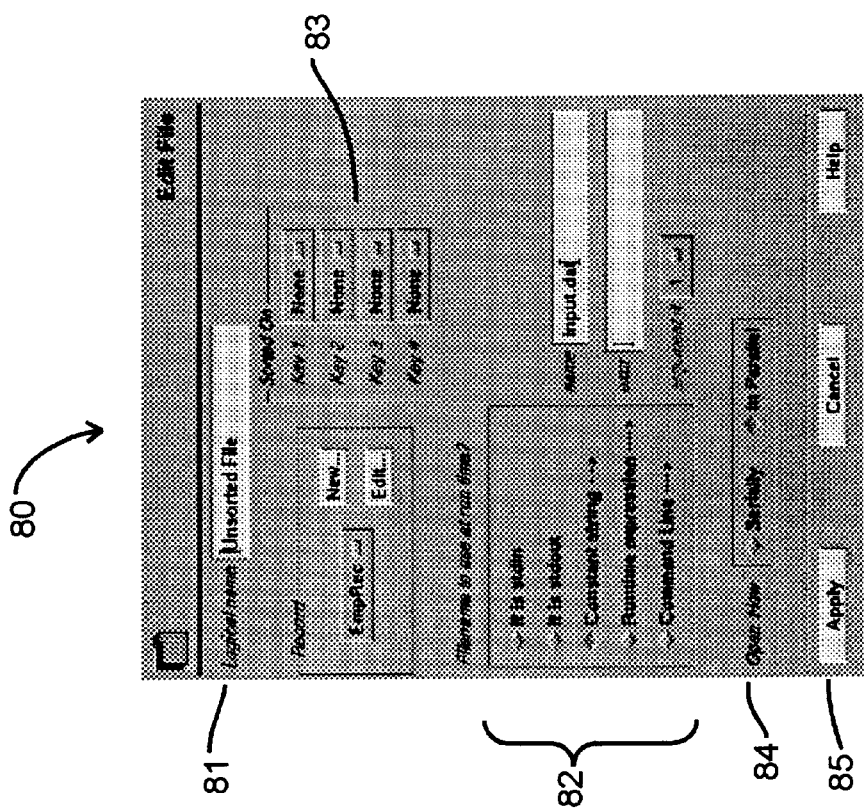

An illustrative dialog box, identified by reference numeral 80, that is used on one embodiment of the invention for the Unsorted File icon is represented in FIG. 4. As shown in FIG. 4, the dialog box 80 has a number of fields, including a Logical Name field 81, an filename field 82, a sort information field 83, a serial/parallel open information field 84 and a set of pushbuttons 85. The program developer can use the logical name field 81 to provide an identifier for the particular instance represented by the icon, which may, but need not, be unique. The user interface 30 can display the name from logical name field 81 in the icon, as shown in FIG. 4. The program developer can use the filename field 82 to specify the file to be used when the program is executed. In the embodiment depicted in FIG. 4, the program developer can specify the file using a constant alphanumeric string, a run-time expression, to indicate that the file will be specified by the operator at run time in a "command line" file specifier entry. Alternatively, for a parallel computer 25 which uses a Unix or Unix-like operating system, the program developer can indicate that the file will be provided from a standard input device, identified in FIG. 4 by the legend "stdin." The program developer can indicate the sort characteristics of the input file using the sort information field 83, and whether the file is to be opened serially or in parallel using the serial/parallel open information field 84. Finally, the program developer can accept the information entered or cancel the operation using the pushbuttons 85.

For an icon representing a file into which the processed data is to be stored, such as the icon in FIG. 3 having the legend "Sorted File," the program developer can provide information similar to that described above for the icon having the legend "Unsorted File" using a dialog box similar to that described above in connection with FIG. 4. For such a dialog box, the program developer can indicate that the file will be provided to a standard output device, identified in FIG. 4 by the legend "stdout."

Figure 5:
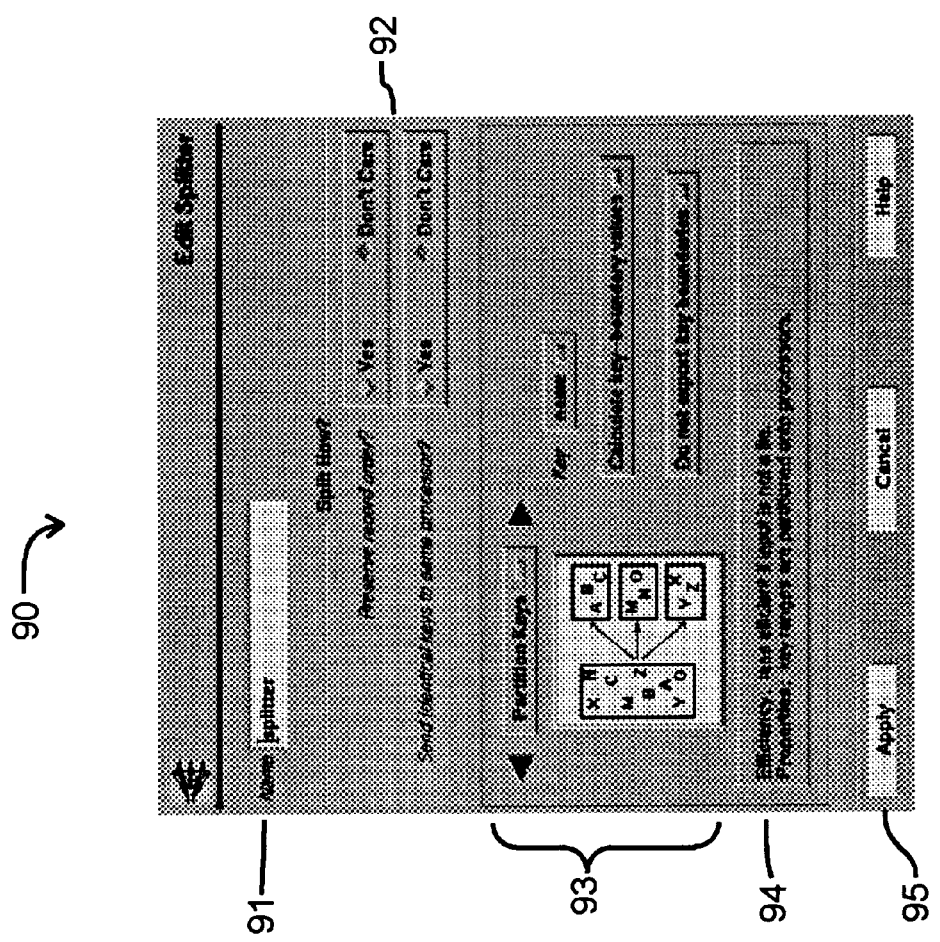

For an icon representing a splitter, such as the icon in FIG. 3 having the legend "Splitter," the program developer can provide such information as how the records in the data received at the input of the instance of the splitter represented by the icon are to be partitioned among processors, whether the record order is to be maintained during the distribution, what attributes of the records are to be used for partitioning, and the like. An illustrative dialog box, identified by reference numeral 90, that is used on one embodiment of the invention for the Splitter icon is represented in FIG. 5. As shown in FIG. 5, the dialog box 90 includes a number of fields, including a name field 91, a split information field 92, a partition information field 93, a developer information field 94 and a set of pushbuttons 95. As with logical name field 81 of dialog box 80, the program developer can provide a name for the particular instance represented by the icon associated with the dialog box 90 using name field 91. The program developer can use the split information field 92 to indicate whether the record order is to be preserved while the data is being distributed to the processors, and whether data which have the same keys are to go to the same processor in the parallel computer 25. The program developer can use the partition information field 93 to provide further information as to how the data is to be distributed among the processors. In one embodiment, the program developer can select among a number of predetermined distribution methodologies, including distributing data so that record keys are grouped into partitions of approximately equal numbers of records or unique keys, or distributed so as to be interleaved among the processors. In that same embodiment, the user interface 30 provides an arrangement whereby the program developer can specie a custom distribution mechanism. In developer information field 94, the user interface 30 can provide some information to the program developer about advantages and disadvantages of selecting a particular distribution methodology. Finally, the program developer can accept the information entered or cancel the operation using the pushbuttons 95.

For an icon representing a combiner, such as the icon in FIG. 3 having the legend "Combiner," the program developer can provide corresponding information, such as how the information to be combined is distributed among the processors, what attributes of the records are to be used for the combining, whether record order is to be maintained during the distribution, and the like. For an icon representing an adapter, the program developer can provide information similar to that described above in connection with both the splitter and combiner icons. Some of the information may be necessary to proper execution of the program, but other of the information can be useful in enhance the efficiency of the program execution.

The user interface 30 can provide similar types of dialog boxes in connection with icons representing other types of components and modules.

The completed program developed by the program developer using the user interface 30 represents a dataflow graph representing the series of operations to be performed on the input data to generate the output data. Generally, the icons in the graph, represent C++ objects in the executable program 23 which are used at run-time by the parallel program execution section 22. Each C++ object may be generated on a one-to-one basis for each of the icons. However, it will be appreciated that, if, for example, during an optimization operation described below, functions represented by a plurality of icons are combined into a fewer number of functions, the executable program 23 may comprise fewer C++ objects than the number of icons in the graph. Contrariwise, if, for example, functions represented by one or more icons more efficiently maps to a larger number of C++ objects, the executable program 23 may comprise a larger number of C++ objects than the number of icons in the graph.

FIGS. 6A and 6B both depict graphs of illustrative sort programs which may be developed using the parallel program development section 21, similar to the program depicted in the program development area 73 of the window 70 shown in FIG. 5. With reference to FIG. 6A, the sort program 40 depicted in that FIG. includes a source file 41, a splitter object 42, a sort object 43, a combiner object 44 and an output file 45, all interconnected by respective ports 46(1) through 46(4) ((generally identified by reference numeral 46(n)). In one embodiment, the source file 41 and the output file 45 may be identified by any file specifier which may be used in connection with the well-known Unix operating system. Accordingly, the source file 41 may represent a data acquisition element connected to the parallel computer 25, and the program may be used to sort the data acquired thereby. In addition, the output file 45 may represent an output device such as a video display device for displaying data to a user or a printer for generating a hard-copy output. It will be appreciated that the source file 41 may alternatively represent a conventional file stored on one or more data storage devices, and the output file 45 may represent a file which is pre-existing when the program is executed, or that is created by the parallel computer 25 during program execution. In addition, the output file 45 may comprise the same file as the source file 41.

In the sort program 40, the sort object 43 is in the form of a parallel processing module as described above. Data to be sorted is provided by the source file, represented by the icon identified by reference numeral 41. The data from the source file 41 is processed through an instance of the splitter object, represented in FIG. 6A by the icon identified by reference numeral 42. Since the sort object 43 comprises a parallel processing module, only one icon, identified by reference numeral 43 is depicted, which represents a parallel sorting program for execution on parallel computer system 25 (FIG. 2). Programs which implement a variety of types of parallel sorting algorithms may be used as the sort object 43.

The splitter object 42, using settings which are controllable by the program developer while the program is being developed, is used to define how the data in the source file 41 is to be distributed among the processing elements forming the parallel computer 25. For example, the splitter object may indicate that the data is to be distributed among the processing elements randomly, in which each of successive records in the file is transferred to a processing element at random. Alternatively, the splitter object 42 may indicate that the data is to be distributed among the processing elements in a uniform fashion, in which successive records in the file are transferred to successive processing elements. As a further alternative, the splitter object may indicate that the data is to be distributed among the processing elements with keys interleaved among the processing elements, or such that each processing element will have a disjoint series of keys. To enhance efficiency in a sorting operation, the program developer may specify that the splitter object represented by icon 43 to distribute the data such that each processing element has a disjoint series of keys; with the data being so distributed, when the data is sorted by the sort object represented by icon 43, each of the processing elements can sort the data locally, without the necessity of transferring data therebetween.

The sort object 43 in the illustrative program 40 depicted in FIG. 6A is a parallel processing module, so that during processing the object 43 can support communications among the processing elements comprising in the parallel computer 25. The sort object 43 enables the processing elements of the parallel computer 25 to sort data provided thereto by the splitter object 42. The sort object 43 may, for example, enable the processing elements to sort the data so that successive processing elements in the parallel computer 25 have successive chunks of the data being sorted, with data within each chunk being in sorted order. In that case, the sorted file can be constructed by concatenating the successive chunks of data. As an alternative example, the sort object 43 may enable the processing elements to sort the data so that the sorted data is interleaved on the successive processing elements. Other organizations of the sorted data among the processing elements of the parallel computer will be apparent to those skilled in the art.

The combiner object 44, using settings which are controllable by the program developer while the program is being developed, is used to define how the sorted data from the processing elements in the source file 41 is to be retrieved from the processing elements forming the parallel computer 25 for storage in the output file 45. It will be appreciated that the program developer will preferably control this definition in relation to the organization of the sorted data on the processing elements as determined by the sort object 43. For example, if the sort object 43 enables the processing elements to sort the data so that successive processing elements have successive chunks of the data, with data within each chunk being in sorted order, the program developer will preferably enable the combiner object 44 to, in turn, enable the successive chunks to be concatenated for transfer to the device which is to store, display or otherwise process the output file 45, thereby to create a unitary output file. On the other hand, if the sort object 43 enables the processing elements to sort the data so that the sorted data is interleaved on successive processing elements, the program developer will preferably enable the combiner object 44 to enable the processing elements to transfer the data in an interleaved fashion to the device which is to store, display or otherwise process the output file 45, thereby to create the unitary output file 45.

As noted above, the ports 46(*n*) serve to link the various elements 41 through 45 together in the dataflow graph which corresponds to the program's iconic depiction in FIG. 6A. The ports 46(*n*) are used in several ways both during program development and when the program is being executed. During program development, the program composition module 33 of the parallel program development section 21 uses each of the ports 46(*n*) to identify the input and output of the respective components interconnected thereby and verify that the data provided by one component at its output can be received by the input of the other component and processed thereby. In that operation, during program composition and generation of the high-level language program 35, the program composition module 33 can traverse the dataflow graph and verify that, for example, the data type of the data provided at the output of one component, matches the data type of the data required at the input of the other component. Thus, if the program developer has instantiated a component 59 receive the data from a particular port 46(*n*) in, for example, integer, floating point or array form, of a particular precision, the program composition module 33 will verify that he or she (that is, the program developer) has instantiated a component to supply data to the same port 46(*n*) of the same integer, floating point or array form of the same precision.

As indicated above, the ports 46(*n*) are also used at program execution time. In particular, during generation of an executable program, the program composition module 33 generates for each port 46(*n*), an input port object associated with the output of each respective component or module in the dataflow graph, and an output port object which is associated with the input of the next respective component or module in the dataflow graph. Each input port object provides data to the component or module object which is also generated for the respective components and modules in the dataflow graph, and each output port object receives data from the component or module object. The combination of output port objects and associated respective input port objects define the order in which data is to be processed by the respective components and modules in the dataflow graph at program execution time. As described above in connection with FIG. 2, during parallel program execution the run-time system 26 controls the processing of the various C++ objects generated and compiled by the parallel program development section. The objects which are generated for the port components serve to link together the objects which are generated for the other types of components and control the sequence in which objects are processed by the parallel computer.

FIG. 6B depicts a sort program 50 that is similar to that depicted in FIG. 6A, except that the sort object is in the form of a replicated sort object 53 instead of a parallel sort object 43. The sort program 50 includes a source file 51, a splitter object 52, the replicated sort object 53, a combiner object 54 and an output file 55, interconnected by ports 56(1) through 56(4) ((generally identified by reference numeral 56(*n*). Elements 51, 52 and 54 through 56(*n*) are similar to the respective objects 41, 42 and 44 through 46(*n*). The replicated sort object 53 represents a "scalar" sort program, which is replicated by a replicator component. The scalar sort program comprises a sort program that executes on one processing element of the parallel computer 25, and will not enable the processing elements to communicate with each other. Such a scalar sort program will enable the processing element that it is controlling to sort the data on that particular processing element. Since the scalar sort program will not enable the processing elements to communicate, it will be appreciated that the splitter and combiner objects 52 and 54 will generally need to, respectively, enable the data to be distributed to the processing elements in disjoint chunks by the keys used for the sort and to enable the processing elements to concatenate the sorted disjoint chunks, since the scalar sort program used in the replicated serial sort object 53 will not enable the processing elements to communicate to verify that the data is sorted thereamong.

With reference again to FIG. 2, as described above, the components and modules that are used with the parallel program development section 21 comprise C++ objects whose information is stored in the module information repository 31, and instantiation information as to the specific object instances that are specified and instantiated by the program developer is stored in the program object repository 32. After the program developer instantiates the objects for the program, the program developer enables the program composition module 33 to use the information in the module information repository 31 and the program object repository 32 to generate the high-level language program 35 in the well-known C++ language. In generating the high-level language program, the program composition module 33 performs a number of operations. Initially, it constructs an internal dataflow graph from the representation of the program that is stored in the program object repository. After the internal dataflow graph is constructed, the program composition module 33 checks the program's syntax. In that operation (that is, the syntax check operation), the program composition module 33 verifies that, for each object instance, all input and/or output connections are connected or terminated by an output file or other type of end point. In addition, the program composition module 33 will verify that the structural limitations of the various types of components and modules are observed. For example, in one embodiment, the splitter and combiner components can each have one input connection and one output connection, and the program composition module 33 will verify that, in the program, each instance of the splitter and combiner components will have only one such input connection and output connection.

During the syntax check operation, the program composition module 33 will also perform a number of additional checks. For example, it (that is, the program composition module 33) will verify that the name of each object instance is unique. In addition, it will verify that all of the information that is required to be provided by the program developer has been provided in the program object repository. For example, the program developer is to provide a file name for each of the source file 41, 51 (FIGS. 6A, 6B) and output file 45, 55, and the program composition module 33 will verify that names have been provided. Similarly, each replicator component is to be provided with an identifier for a module to be replicated, and the program composition module 33 will verify that each replicator component has been provided with such a module identifier. The program composition module 33 will also verify that any values provided by the program developer for object instances are within permitted ranges.

Following the syntax check operation, the program composition module 33 propagates constraint or characteristic information provided by the program developer, and default information if no such information was provided by the program developer, through the port object instances from one component or module object instance to another program or module object instance, through the port object instance interconnecting the object instance. In that operation, a particular object instance had associated therewith particular constraint or characteristic information or default information, and no such corresponding information was provided for the other object instance, the program composition module will provide the constraint or characteristic information or default information for the object instance for which the information was not provided.

Following the information propagation phase, the program composition module 33 will perform a semantic analysis to ensure that semantics of the object instances comprising the program are consistent. In that phase, the program composition module 33 will compare the port object instance and the component and module object instances to which they are connected to make sure that they refer to the same data type, that they have the proper direction references, that they reference the same "diameter," and that they reference consistent sorting attributes. In verifying that the port object instances and the component and module object instances reference the same diameter, the program composition module verifies that the amount of data to be provided by an upstream object instance in parallel corresponds to the amount of data that the downstream object instance can receive in parallel.

Following the semantic analysis phase, the program composition module 33 will perform an optimization phase. During the optimization phase, the program composition module 33 searches the dataflow graph for groups of object instances that can be combined into a fewer number of object instances and, when it finds such selectively generates new object instances to replace such groups. For example, if the dataflow graph contains two successive adapter object instances, splitter object instances, replicator object instances or merge object instances, it can replace them with, respectively, a single object instance of the same type.

Similarly, if the dataflow graph contains two successive object instances that enable complementary operations whose effect cancel each other, such as a splitter object instance followed by a merge object instance, or a merge object instance followed by a splitter object instance, the program composition module 33 may eliminate both object instances during the optimization phase. It will be appreciated, however, that if, for example, a splitter object instance is followed by a merge object instance, but the splitter object instance enables a different sort ordering than that enabled by the merge object instance, the effect of the merge object instance will not cancel out the effect of the splitter object instance. Similarly, if a merge object instance is followed by a splitter object instance, but the merge object instance enables a different sort ordering than that enabled by the splitter object instance, the effect of the splitter object instance will not cancel out the effect of the merge object instance. In those cases, since the effects of the object instances do not cancel each other, the program composition module 33 will not eliminate the object instances.

In addition, during the optimization phase, the program composition module 33 will attempt to remove object instances from the dataflow graph which enable redundant operations. For example, if the dataflow graph contains a adapter object instance is followed by a splitter object instance, the program composition module 33 can replace both objet instances with a single adapter object instance that enables the same data distribution as the two object instances in the dataflow graph. Similarly, if the dataflow graph contains a merge object instance followed by a adapter object instance, the program composition module 33 can replace both object instances with a single adapter object instances that enables the same merge as the two object instances in the dataflow graph.

Following the optimization phase, the program composition module 33 will use the optimized dataflow graph generated during the optimization phase, to generate the high-level language program 35. In that operation, the program composition module 33 can traverse the optimized dataflow graph and generate code for the object instances in the graph. The code generated by the program composition module 33 during this code generation phase comprises the high-level language program 35. As indicated above, the program composition module 33, in one embodiment, generates code in the well-known C++ high-level language. The operations performed by the program composition module 33 in generating code in the C++ high-level language are similar to those that are well-known in the art, and will not be described herein.

After the program composition module 33 has generated the high-level language program 35, the compiler 34 compiles the executable program, using a run-time library 36. Thereafter, the executable program 25 can be executed by the parallel computer 25 under control of the run-time system 26. The run-time system 26 includes an execution control object which controls the various modules of the program, as will be described in connection with FIG. 7. FIG. 7 depicts a block diagram representing the execution environment 60, including the various elements which cooperate in execution of the program represented in FIG. 6A, including a source file executable object 61, a splitter executable object 62, a sort executable object 63, a merge executable object 64 and an output file executable object 65, all interconnected by respective port executable objects 66($p$) (index "p" extending from "one" to "four"). The executable objects 61 through 65 and 66($p$) represent executable program code modules or other elements (generally, "executable objects") that are generated by the program composition module 33 and compiled by the compiler 34. In addition, the execution environment 50 also includes an execution control object 67 which controls processing in connection with the executable objects 61 through 65 and 66($n$). As shown in FIG. 7A, each of the executable objects 61 through 65 (generally represented by executable object 70) includes an execution control/object interface portion 71 and an operational object 72. Generally, the execution control/object interface portion 71 operates as the interface for the executable object 70 with the execution control object 67, and the operational object 72 enables parallel computer 25 to perform the actual operations which are to be performed in connection with the component and/or module associated with the executable object 70. The operational object 72 received data from port executable object(s) 66($u$) upstream thereof and provides processed data to port executable object(s) 66($d$) downstream thereof.

In one embodiment, the execution control object 67 is distributed among and executed by all of the processing nodes in the parallel computer 25. The execution control object 67 generally controls scheduling of the execution of the respective executable objects, and can, for example, enable the execution control/object interface portion 71 to, for example, initialize the operational object 72 at the beginning of its operations, and to eliminate the operational object 72 if it has completed its processing operations and will no longer needed. The respective executable objects 61 through 65 operate in a dataflow manner, that is, each will receive and process data provided to it by the respective port executable object 66($p$) (if any) connected upstream thereof (that is, to the left of the respective icon as shown in FIG. 7) and will transfer processed data to the respective port executable object 66($p$) (if any) connected downstream thereof (that is, to the right of the respective icon as shown in FIG. 7). In that operation, each of the respective executable objects 61 through 65 (in particular, the operational object 72 thereof) will effectively continually attempt to obtain data from its respective upstream port executable object 66($p$) for processing. If the upstream port executable object 66($p$) is unable to provide data for processing, which may occur if, for example, it has not received data from the executable object upstream thereof, it (that is, the respective upstream port executable object 66($p$)) will provide status information so indicating to the execution control object 67, indicating the existence of a blocking condition. The upstream port executable object 66($p$) may be unable to obtain data from a port executable object 66($n$) to process for a number of reasons, including, for example, that (i) the executable object 61 through 65 that is upstream of the upstream port executable object 66($p$) has not yet provided any of the data to be processed to the port executable object 66($p$), which can occur, for example, if that executable object 61 through 65 itself has not received any data for processing or if it is not finished processing of the data that it has received;

(ii) the executable object 61 through 65 that is upstream of the upstream port executable object 66($p$) has provided some of the data to be processed to the port executable object 66($p$), but the port executable object 66($p$) has received all of the data that has been processed up to that point in time;

(iii) all of the data to be processed has been provided to the respective executable object 61 through 65, and there is no further data to be processed;

(iv) an executable object or downstream port executable object upstream thereof is malfunctioning, and the like. If a respective executable object 61 through 65 is unable to obtain data from its upstream port executable object 66($p$), the upstream port executable object 66($p$) will provide status information to the execution control object 67 indicating its blocked status and the reason for the blocked condition.

Similarly, in one embodiment the port executable objects 66($p$) buffer data being transferred between respective executable objects. In that embodiment, the port executable objects 66($p$), for example, can buffer respective predetermined maximum amounts of data, and if port executable object 66($p$) is buffering the maximum amount, the executable object 61 through 64 upstream thereof will be unable to provide additional data thereto until the executable object 62 through 65 downstream thereof retrieves data therefrom for processing. In that case, the respective port executable object (66)($p$) will also be in a blocked condition, and will provide status information to the execution control object 67 indicating its blocked status. In addition, a blocking condition may arise out of delays in transferring data among processors of the parallel computer 25.

In response to receipt of status information from a port executable object 66($p$) indicating that it is blocked because (i) it is unable to obtain data from the executable object 61 through 64 connected upstream thereof, or (ii) its buffer is full, the execution control object 67 will attempt to determine the cause of the blockage and, if necessary, to correct the blockage. Thereafter, the execution control object 67 can provide control information enabling the blocked port executable object 66($p$) to restart. In particular, if a particular port executable object 66($p$) is waiting for data, and there is more data to be provided thereto for processing (item (i) above), the execution control object 67 can enable executable objects upstream of the respective executable object to execute, and when data is available for the particular blocked upstream port executable object 66($p$), it (that is, the execution control object 67) can remove the block and enable the port executable object 66($p$) to restart. On the other hand, if the particular executable object 61 through 65 upstream of a port executable object 66($p$) have finished processing all of the data to be processed, the execution control object 67 can leave the upstream port executable object 66($p$) in a blocked condition, or it can remove the executable object and free up resources in the parallel computer 25.

If the execution control object 67 determines that a port executable object 66($p$) is blocked because of a malfunction upstream thereof, it (that is, the execution control object 67) can attempt to correct the malfunction, or, if it is unable to correct the malfunction, it may perform predetermined malfunction correction operations, which may include terminating the program.

Similarly, if the execution control object 67 determines that a port executable object 66($p$) is blocked because the executable object 62 through 65 downstream thereof is currently unable to accept additional data therefrom, it (that is, the execution control object 67) may perform one or all of several corrective operations. For example, it may enlarge the port executable object's buffer to allow more data to be buffered, or may it buffer data from the downstream port executable object 66($p$) elsewhere in the parallel computer system 25, thereby freeing up resources in the downstream port executable object 66($p$)) so that it (that is, the blocked port executable object 66($p$)) can accept additional data from the executable object upstream thereof. In addition, it (that is, the execution control object 67) may attempt to determine if a executable object 62 through 65 downstream of the blocked downstream port executable object 66($p$) is malfunctioning and, if so, attempt to correct the malfunction as described above.

A specific example will help illustrate the scheduling operations performed by the execution control object 67. For example, during execution of the program depicted in FIG. 7, the source file executable object 61 will enable the parallel computer 25 to provide data from the actual source data file to the processing elements of the parallel computer 25 for processing under control of the program code comprising port executable object 66(1) downstream thereof. The port executable object 66(1) will, in turn, provide the data to the program code comprising the splitter executable object 62. The splitter executable object 62, in turn, will enable the processing elements of the parallel computer 25 to distribute data provided thereto during processing of the source file executable object 61, using the distribution criteria provided by the program developer during program development. If the port executable object 66(1) does not have any data to provide to the splitter executable object 62 that is processed by a particular processing element, which can occur as described above, it (that is, the port executable object 66(1)) will provide status information (represented by the arrow labeled "STATUS") to the execution control object 67 so indicating, and will block.

In response to the status information received from the port executable object 66(1) indicating that it is blocked, the execution control object 67 will determine the cause of the blockage. For example, if the source file executable object 61 has not yet begun operation, it (the execution control object 67) can enable it to begin operating, and thereafter control the port executable object 66(1) (represented by the arrow labeled "CONTROL") to restart. Similarly, if the source file executable object 61 is temporarily paused in providing data, the execution control object 67 can enable the port executable object 66(1) to restart when pause has terminated and the source file executable object 61 has resumed providing data. On the other hand, if the source file executable object 61 has provided all of the data that is to be provided, when the port executable object 66(1) has completed providing data to the splitter executable object 61 for distribution, the execution control object 67 can leave the port executable object 66(1) in a blocked condition, or, alternatively, remove the program code and other resources of the parallel computer system 25 allocated to the port executable object 66(1) from the parallel computer system 67, thereby freeing up resources for other elements of the program.

Similarly, when the splitter executable object 62 has distributed all of the data, the port executable object 66(2) downstream thereof will enter a blocking condition, and provide status information to the execution control object 67 representative thereof. When the execution control object 67 determines that the cause of the blocking condition is that all of the data to be distributed by the splitter executable object 62 has been distributed, it (that is, the execution control object 67) can leave the port executable object 66(2) in a blocked condition in a similar manner, or, alternatively, remove the program code and other resources of the parallel computer system 25 allocated to both the port executable object 66(2) and the splitter executable object 62 from the parallel computer system 67, thereby freeing up resources for other elements of the program.

Alternatively, if, in response to the status information (represented by the arrow labeled "STATUS") received from the port executable object 66(1) indicating that it (that is, the upstream port executable object 66(1)) is blocked, the execution control object 67 determines that the source file executable object 61 is malfunctioning, the execution control object 67 can attempt to correct the malfunction. In that operation, the execution control object 67 may determine, for example, that the program code for the source file executable object 61 has become corrupted, in which case it (that is, the execution control object 67) may enable the program code to be re-loaded. On the other hand, the execution control object 67 may determine that the source file executable object 61 is malfunctioning because file from which the source file executable object 61 is to obtain data does not exist, in which case the execution control object 67 may enable a prompt to be displayed to an operator to enable him or her to provide an identifier for an appropriate file. Alternatively, the execution control object 67 may determine that the malfunction is not correctable, in which case it may terminate processing of the program.

As a further alternative, if, in response to the status information (represented by the arrow labeled "STATUS") received from the port executable object 66(1) associated with the source file executable object 61 indicating that it (that is, the port executable object 66(1)) is blocked, the execution control object 67 determines that the blockage is due to the port executable object 66(1) being unable to accept additional data, it (that is, the execution control object 67) may enable data that is being buffered by the port executable object 66(1) to be buffered elsewhere in the parallel computer 25. Thereafter, the execution control object 67 can enable the port executable object 66(1) to resume operations and accept additional data from the source file executable object. In addition, the execution control object 67 can determine whether the executable objects downstream of the port executable object 66(1), such as the upstream port executable object 66(1) and splitter executable object 62, along with the other executable objects (parallel sort executable object 63, merge executable object 64 and output file executable object 65) and input and downstream port executable objects are operating properly, and, if not, take corrective actions.

The execution control object 67 will perform operations similar to those described above, in connection with each of the executable objects 61 through 65 and port executable objects 66(p).

Figure 8:
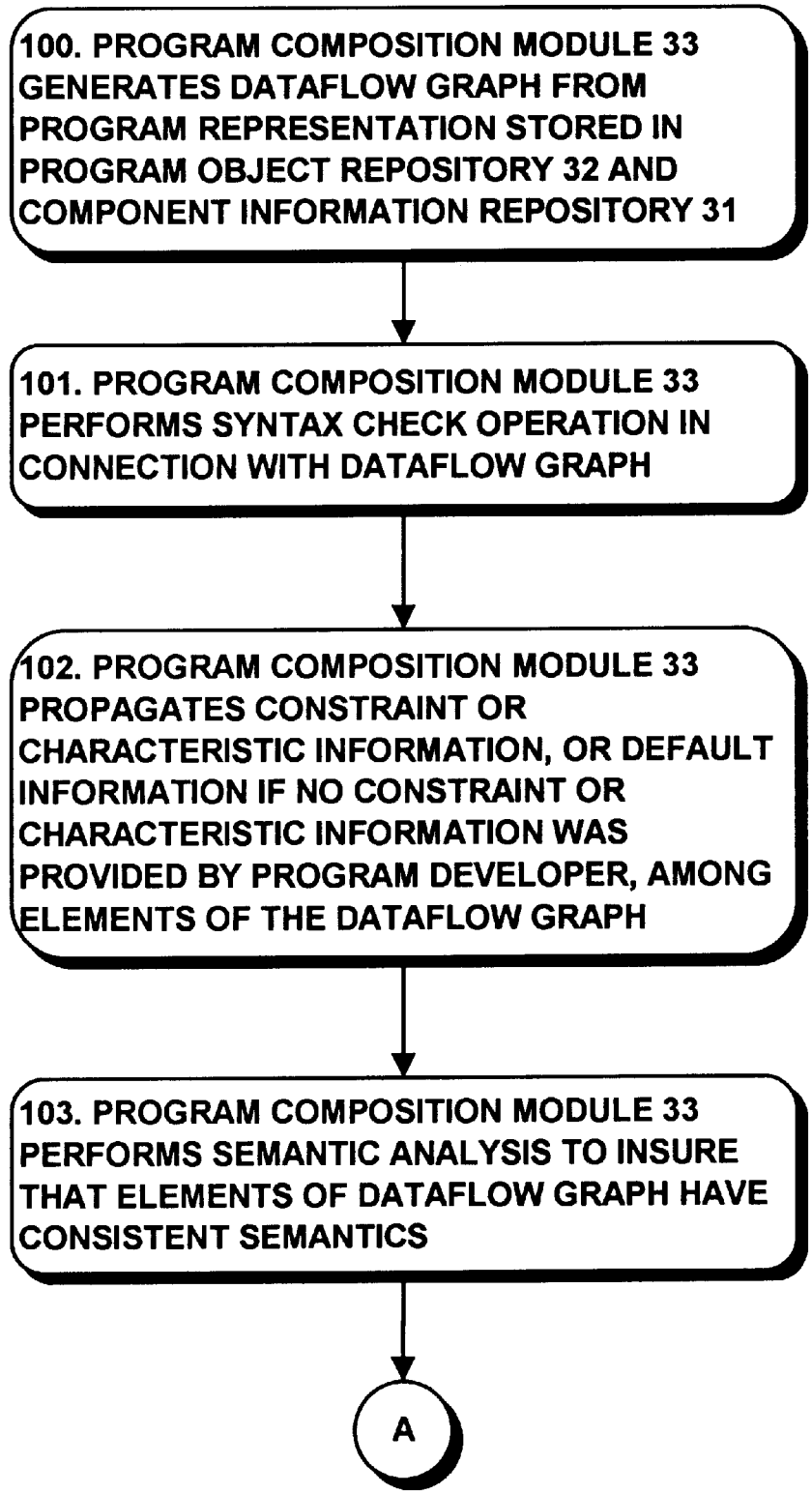
FIGS. 8 and 9 depict flowcharts illustrating selected operations performed by the parallel program development section and parallel program execution section, in accordance with the invention.
Figure 8:
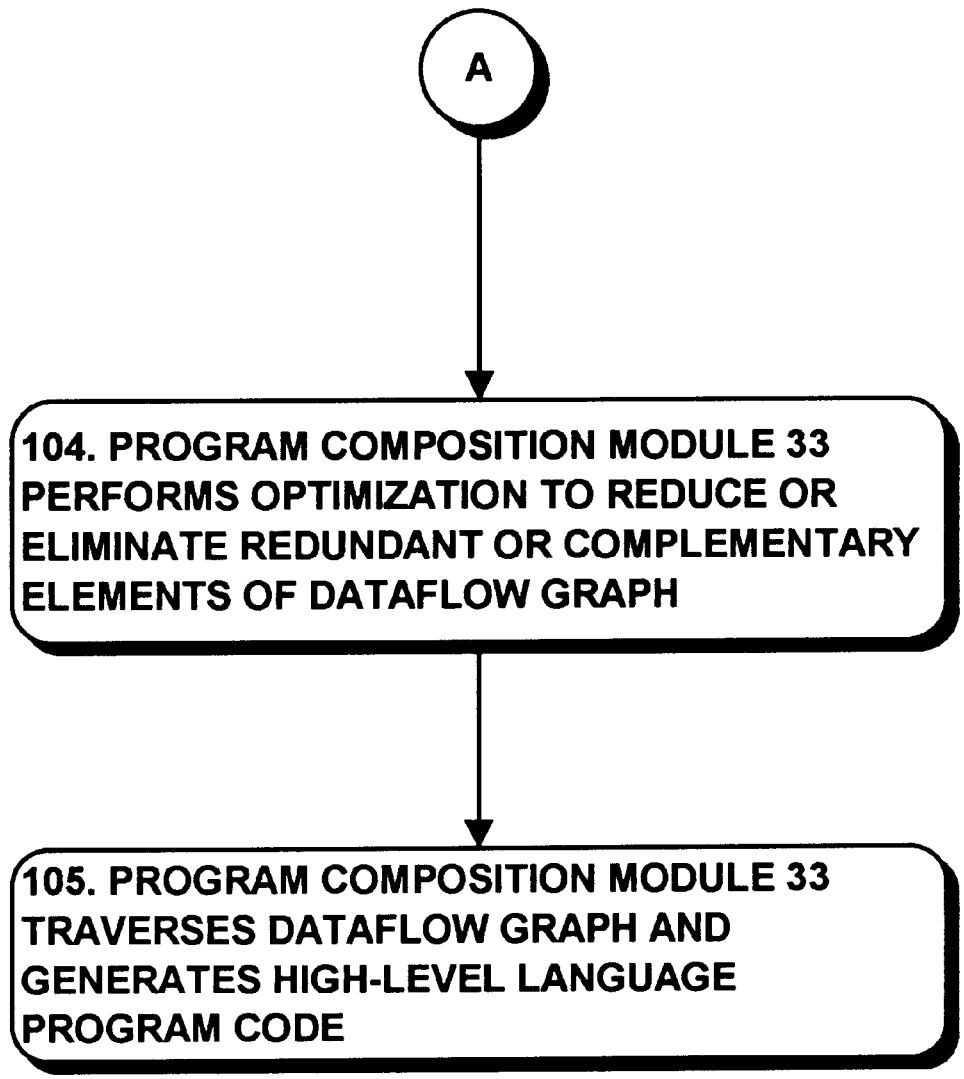
Figure 9:
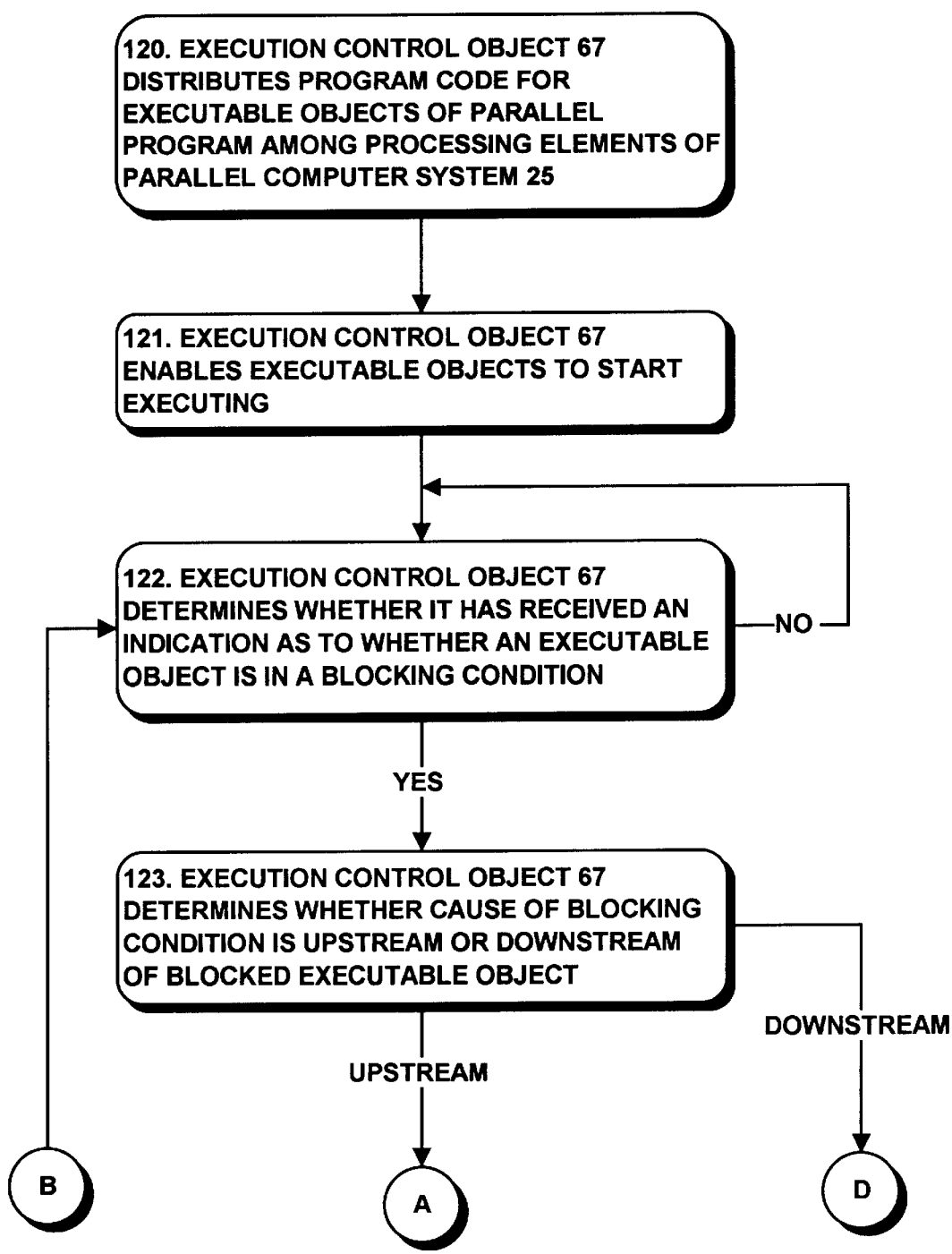

FIGS. 8 and 9 depict flowcharts illustrating selected operations performed by the parallel program development section 21 and parallel program execution section 22 as described above. In particular, FIG. 8 depicts a flowchart illustrating operations performed by the program composition module 33 in generating the high-level language program from the information in the module information repository 31 and the program object repository. FIG. 9 depicts a flowchart illustrating operations performed by the execution control object 67 in controlling processing by the executable objects comprising the programs. The series of operations depicted in FIGS. 8 and 9 correspond to the operations as described above.

The invention provides a number of advantages. In particular, the invention provides a graphical parallel program development system 20 which simplifies development and processing of programs for parallel computer systems, using a graphical representation for the program, thereby reducing the need for highly-trained programmers to develop such programs. Since the graphical parallel program development system 20 makes use of a graphical representation of the program under development, instead of arcane lines of program code, and in particular depicts a dataflow graph of the operations to be performed in connection with the data to be processed, a program developer can more readily discover and correct algorithmic errors in the program. In addition, since the graphical parallel program development system 20 performs checking operations during program composition to verify consistency between interconnected component and module instances, and displays errors to the program developer in conjunction with the component and module instances at which the errors arose, the program developer can readily identify locations in the program which need modification.

Furthermore, the graphical parallel program development system 20 constructed in accordance with the invention provides for the use of standard serial or parallel software routines as components in the respective serial or parallel modules, simplifying their adaptation for use in complex parallel programs. Such standard serial and parallel software routines may be used, for example, as operational objects 72 in respective executable objects 70 (FIG. 7A) Since the ports which connect the serial and parallel modules into the system can handle blocking and associated inter-processor synchronization for data provided thereto by other elements of the program upstream of the respective modules in the dataflow graph, and provided thereby to other elements of the program downstream in the dataflow graph, the respective routines need not be provided with code to handle these operations. Indeed, the standard routines need only be able to read data from and/or write data to the respective ports. The ports handle the interaction of the parallel program with the execution control object, not the standard serial and parallel software routines. In addition, since the execution control/object interface 71 controls initialization of the respective software routine under control execution control object 67, the software routine itself does not need to be provided with code to handle interactions with the execution control object 67. Accordingly, the standard serial and parallel software routines need not be customized to interact with the execution control object, further enhancing the reliability of the program.

In addition, since the system generates, from the parallel programs, programs in a high-level language, the graphical parallel program development system 20 constructed in accordance with the invention can take advantage of improvements in high-level languages and compilers therefor.

Furthermore, the invention, by providing for program development using a graphical user interface ("GUI"), using a drag-and-drop metaphor, allows a program developer to view the program logic, represented by the dataflow graph displayed in the window, and hides details of complex program coding which is often required in development of programs for execution on parallel computer systems.

It will be appreciated that a number of changes and modifications may be made to the system. For example, although the system has been described as using particular types of components and modules, it will be appreciated that systems in accordance with the invention may use fewer such components and modules, or additional components and modules with other capabilities. In addition, although the system has been described as generating a high-level language program in the C++ language, it will be appreciated that other languages can also be used. In addition, although the system has been described as generating a high-level language program in an object-oriented language, it will be appreciated that the high-level language program may be generated in a nonobject-oriented language.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by letters patent of the united states is:

1. A system for facilitating the development of a computer program for execution on a parallel processing system, each said computer program comprising instances of ones of a predetermined set of program components, each program component being adapted to control said parallel processing system to perform an associated predetermined type of processing operation, the computer program development system comprising:

A. a component information repository configured to store program component prototype information for each of said program components in said predetermined set, said program component prototype information including information for controlling said parallel processing system to perform the associated predetermined type of parallel processing operation and, for at least one of said types of program component, customizable information identifying at least one customizable feature of the associated program component;

B. a program object repository configured to store program component instance selection information identifying particular ones of said program components which are instantiated for a computer program and program component linking information identifying a processing order for said program components, thereby to establish a dataflow graph which identifies an order in which processing operations defined by said program components are to be applied to data input thereto, said program object repository further being configured to store program component customization information for at least some of said program components which are instantiated;

C. a user interface adapted to be used by said program developer to select and link together program components from said predetermined set thereby to generate program component instance selection information and program component linking information, thereby to establish said dataflow graph; and D. a program generator configured to (i) generate a program executable by said parallel processing system in response to (a) said program component prototype information from said component information repository, and (b) said program component instance selection information, said program component linking information and said program component customization information in said program object repository, and (ii) perform a program verification operation and generate error information in response to an error indication during said program verification operation.

2. A system as defined in claim 1 in which said user interface is a graphical interface include a graphical display for displaying information to said operator in graphical form, and an operator input device, the graphical display being configured to display a plurality of icons, each representing one of said program components, said operator input device being manipulable by said program developer to select ones of said icons thereby to instantiate the associated program component.

3. A system as defined in claim 2 in which said operator input device is further manipulable by said program developer to link said selected icons thereby to establish said dataflow graph.

4. A system as defined in claim 2 in which said operator input device is further manipulable by said program developer to provide program component customization information for said at least some of said program components which are instantiated, the user interface being configured to receive said program component customization information and provide it to said program object repository for storage.

5. A system as defined in claim 1 in which said user interface further includes a program generator enabler operable by said program developer to enable said program generator to operate.

6. A system as defined in claim 1 in which the user interface is further configured to provide said error indication to said program developer.

7. A system as defined in claim 1 in which said program generator includes:
  A. a program composition module configured to generate a program in a predetermined high-level language in response to (i) said program component prototype information from said component information repository, and (ii) said program component instance selection information, said program component linking information and said program component customization information in said program object repository; and
  B. a high-level language compiler for performing a compilation operation to generate said executable program in response to said high-level language program.

8. A method of facilitating the development of a computer program for execution on a parallel processing system, each said computer program comprising instances of ones of a predetermined set of program components, each program component being adapted to control said parallel processing system to perform an associated predetermined type of processing operation, from program component prototype information for each of said program components in said predetermined set, said program component prototype information including information for controlling said parallel processing system to perform the associated predetermined type of parallel processing operation and, for at least one of said types of program component, customizable information identifying at least one customizable feature of the associated program component, the computer program development method comprising the steps of:
  A. enabling a user interface adapted to be used by said program developer to select and link together program components from said predetermined set thereby to generate program component instance selection information and program component linking information, thereby to establish a dataflow graph which identifies an order in which processing operations defined by said program components are to be applied to data input thereto,
  B. storing program component instance selection information identifying particular ones of said program components which are instantiated for a computer program and program component linking information identifying the processing order for said program components defined by the dataflow graph, and program component customization information for at least some of said program components which are instantiated, and
  C. a program generating step of (i) generating a program executable by said parallel processing system in response to (a) said program component prototype information from said component information repository, and (b) said program component instance selection information, said program component linking information and said program component customization information in said program object repository, and
  (ii) performing a program verification operation and generate error information in response to an error indication during said program verification operation.

9. A method as defined in claim 8 in which said user interface is a graphical interface including a graphical display for displaying information to said operator in graphical form, and an operator input device, the graphical display being configured to display a plurality of icons, each representing one of said program components, said user interface enabling step including the step of enabling said operator input device to be manipulate by said program developer to select ones of said icons thereby to instantiate the associated program component.

10. A method as defined in claim 9 in which said user interface enabling step includes the step of enabling said operator input device to be manipulated by said program developer to link said selected icons thereby to establish said dataflow graph.

11. A method as defined in claim 9 in which said user interface enabling step includes the step of enabling said operator input device to be manipulated by said program developer to provide program component customization information for said at least some of said program components which are instantiated, the user interface being configured to receive said program component customization information and provide it to said program object repository for storage.

12. A method as defined in claim 8 further including the step of allowing the program developer to, in turn, initiate the program generating step.

13. A method as defined in claim 8 further including the step of providing said error indication to said program developer.

14. A method as defined in claim 8 in which said program generating step includes the steps of:
  A. generating a program in a predetermined high-level language in response to (i) said program component prototype information from said component information repository, and (ii) said program component instance selection information, said program component linking information and said program component customization information in said program object repository; and
  B. compiling the high-level language program to generate said executable program.

15. A computer program product for use in connection with a computer to facilitate the development of a computer program for execution on a parallel processing system, each said computer program comprising instances of ones of a predetermined set of program components, each program component being adapted to control said parallel processing system to perform an associated predetermined type of processing operation, the computer program product comprising a computer readable medium having encoded thereon:
  A. a component information repository module configured to enable the computer to store program component prototype information for each of said program components in said predetermined set, said program component prototype information including information for controlling said parallel processing system to perform the associated predetermined type of parallel processing operation and, for at least one of said types of program component, customizable information identifying at least one customizable feature of the associated program component;
  B. a program object repository module configured to enable the computer to store program component instance selection information identifying particular ones of said program components which are instantiated for a computer program and program component linking information identifying a processing order for said program components, thereby to establish a dataflow graph which identifies an order in which processing operations defined by said program components are to be applied to data input thereto, said program object repository further being configured to store program component customization information for at least some of said program components which are instantiated;

C. a user interface module configured to enable the computer to, in turn, enable the program developer to select and link together program components from said predetermined set thereby to generate program component instance selection information and program component linking information, thereby to establish said dataflow graph; and D. a program generator module configured to enable the computer to (i) generate a program executable by said parallel processing system in response to (a) said program component prototype information from said component information repository, and (b) said program component instance selection information, said program component linking information and said program component customization information in said program object repository, and (ii) perform a program verification operation and generate error information in response to an error indication during said program verification operation.

16. A computer program product as defined in claim 15 in which said user interface module enables the computer to provide a graphical interface including a graphical display for displaying information to said operator in graphical form, and an operator input device, the graphical display being configured to display a plurality of icons, each representing one of said program components, said operator input device being manipulable by said program developer to select ones of said icons thereby to instantiate the associated program component.

17. A computer program product as defined in claim 16 in which said operator input device is further manipulable by said program developer to link said selected icons thereby to establish said dataflow graph.

18. A computer program product as defined in claim 16 in which said operator input device is further manipulable by said program developer to provide program component customization information for said at least some of said program components which are instantiated, the user interface module enabling the computer to receive said program component customization information and provide it to said program object repository for storage.

19. A computer program product as defined in claim 15 in which said user interface module further enables said computer to, in turn, enable program developer to enable operations under control of said program generator module.

20. A computer program product as defined in claim 15 in which the user interface module is further configured to enable said computer to provide said error indication to said program developer.

21. A computer program product as defined in claim 15 in which said program generator module includes:

A. a program composition module configured to enable the computer generate a program in a predetermined high-level language in response to (i) said program component prototype information from said component information repository, and (ii) said program component instance selection information, said program component linking information and said program component customization information in said program object repository; and B. a high-level language compiler module for enabling the computer to perform a compilation operation to generate said executable program in response to said high-level language program.

* * * * *